(12) United States Patent
Tozaki et al.

(10) Patent No.: US 6,328,344 B1
(45) Date of Patent: Dec. 11, 2001

(54) PIPE FITTING WITH IMPROVED FITTING CHECKER

(75) Inventors: Kenji Tozaki; Masatoshi Harada, both of Aichi (JP)

(73) Assignee: Togo Seisakusyo Corporation, Aichi (JP)

( * ) Notice: Subject to any disclaimer, the term of this patent is extended or adjusted under 35 U.S.C. 154(b) by 0 days.

(21) Appl. No.: 09/395,170

(22) Filed: Sep. 14, 1999

(30) Foreign Application Priority Data

Sep. 17, 1998 (JP) .................................................. 10-263628
Nov. 17, 1998 (JP) .................................................. 10-326907
Jul. 12, 1999 (JP) .................................................. 11-197874

(51) Int. Cl.$^7$ ............................. F16L 35/00; F16L 55/00
(52) U.S. Cl. ........................... 285/93; 285/4; 285/120.1; 285/148.13; 285/305; 285/325
(58) Field of Search ............................. 285/93, 4, 120.1, 285/325, 148.13, 305

(56) References Cited

U.S. PATENT DOCUMENTS

| | | | |
|---|---|---|---|
| D. 398,819 | * | 9/1998 | Kondou .................................. D8/14 |
| 4,802,697 | * | 2/1989 | Bartholomew ....................... 285/319 |
| 4,915,420 | * | 4/1990 | Washizu ................................ 285/39 |
| 4,946,205 | | 8/1990 | Washizu . |
| 5,152,555 | * | 10/1992 | Szabo .................................... 285/93 |
| 5,178,424 | * | 1/1993 | Klinger ................................ 285/319 |
| 5,401,063 | * | 3/1995 | Plosz ..................................... 285/81 |
| 5,429,395 | * | 7/1995 | Ketcham ............................... 285/87 |
| 5,441,313 | * | 8/1995 | Kalahasthy ........................... 285/93 |
| 5,542,712 | * | 8/1996 | Klinger et al. ........................ 285/93 |
| 5,586,792 | * | 12/1996 | Kalahasthy et al. ................ 285/319 |
| 5,704,658 | * | 1/1998 | Tosaki et al. ........................ 285/305 |
| 5,779,279 | * | 7/1998 | Bartholomew ....................... 285/93 |
| 5,863,077 | * | 1/1999 | Szabo et al. ............................ 285/3 |
| 5,897,145 | * | 4/1999 | Kondo et al. .......................... 285/93 |
| 5,931,509 | * | 8/1999 | Bartholomew ......................... 285/93 |
| 5,947,531 | * | 9/1999 | Eckard et al. ....................... 285/319 |
| 5,951,063 | * | 9/1999 | Szabo .................................. 285/303 |
| 6,145,886 | * | 11/2000 | Ohta et al. ............................. 285/4 |
| 6,145,887 | * | 11/2000 | Cambot-Courrau .................... 285/4 |

FOREIGN PATENT DOCUMENTS

| | | |
|---|---|---|
| 0 505 930 | 9/1992 | (EP) . |
| 0 743 481 | 11/1996 | (EP) . |
| 6-18117 | 5/1994 | (JP) . |
| 6-18118 | 5/1994 | (JP) . |

* cited by examiner

Primary Examiner—B. Dayoan
Assistant Examiner—Carlos Lugo
(74) Attorney, Agent, or Firm—Wenderoth, Lind & Ponack, L.L.P.

(57) ABSTRACT

A pipe fitting includes a slider disposed in an insertion hole of a main body so as to be axially moved and includes a pressed portion which a falling-off preventing flange of a pipe abuts so that the slider is pressed axially when the pipe is inserted into the insertion hole. A fitting checker includes a pair of spreading legs having respective claws, the fitting checker being detachably attached to the main body so that the legs hold the main body. The claws engage the body and the slider so that the fitting checker is not allowed to be detached from the body when the legs are closed. The legs are spread so as to release the claws from engagement with the body and the slider so that the fitting checker is allowed to be detached from the body. Releasing protrusions are formed to protrude from inside portions of the legs of the fitting checker, the releasing protrusions being pressed so that the legs are elastically deformed in respective opening directions. A pressing portion is formed on the slider so as to press the disengaging protrusions of the fitting checker to spread the legs of the latter when the pipe is inserted into the insertion hole to assume a normal fitting position so that the slider is displaced to a normal thrust position.

6 Claims, 29 Drawing Sheets

PIPE FITTING WITH IMPROVED FITTING CHECKER

BACKGROUND OF THE INVENTION

1. Field of the Invention

This invention relates generally to a pipe fitting for connecting a metal pipe or a resin tube, each having a relatively small diameter and used in automobiles, for example, and more particularly to such a pipe fitting provided with a checking member for checking normal fitting of the pipe or tube.

2. Description of the Prior Art

Japanese Utility Model Publication No. 6-18117 discloses a pipe fitting of the above-described type. The disclosed pipe fitting comprises a main body having an inner insertion hole and a checking member for checking that a pipe has been inserted into the body to thereby reach a normal depth. Whether the pipe has normally been fitted depends upon whether the checking member, which usually not allowed to be pulled out, is allowed to be pulled out as the result of the normal insertion of the pipe.

More specifically, the main body of the pipe fitting has an opening formed in a circumferential wall thereof. The checking member, having bifurcated legs, is inserted into the opening so that a projecting portion thereof confronts the interior of the insertion hole. When the pipe is inserted into the insertion hole to reach the normal depth, a flange-like bulging portion formed on an outer circumference of the pipe pushes the projecting portion of the checking member radially so that the legs of the checking member spread, whereby the checking member is released from the engagement with the main body.

In the above-described construction, however, the projecting portion of the checking member confronts the interior 5 of the insertion hole through the opening of the pipe fitting. Accordingly, the opening is exposed to the outside after the checking member is pulled out of it. Foreign matter such as dust easily enters the main body of the pipe fitting through the opening. This poses a problem.

SUMMARY OF THE INVENTION

Therefore, an object of the present invention is to provide a pipe fitting which can effectively prevent foreign matter from entering the main body of the pipe fitting.

The present invention provides a pipe fitting into which a pipe, having a falling-off preventing flange bulging along an outer circumference near one end thereof, is inserted, thereby connecting the pipe. The pipe fitting comprises a main body having an insertion hole into which the pipe is inserted and a circumferential wall formed with a window communicating with the insertion hole. A pipe retainer is attached to the main body so as to be elastically deformable. The pipe retainer includes a falling-off preventing protrusion protruding through the window of the main body into the insertion hole. The falling-off preventing protrusion is pushed by the falling-off preventing flange of the pipe radially outward with respect to the main body during insertion of the pipe into the insertion hole so that the falling-off preventing flange is allowed to pass the falling-off preventing protrusion. The falling-off preventing protrusion is returned, by elasticity of the pipe retainer, to a position where the protrusion protrudes into the insertion hole, after the falling-off preventing flange has passed the falling-off preventing protrusion, thereby limiting movement of the falling-off preventing flange in a falling-off direction. A slider is provided in the insertion hole of the main body so as to be moved axially with respect to the main body. The slider includes a pressed portion which the falling-off preventing flange abuts so that the slider is axially thrust inward when the pipe is inserted into the insertion hole of the main body. A fitting checker includes a pair of spreadable legs having respective claws. The fitting checker is detachably attached to the main body so that the legs thereof hold the main body. The claws engage the body and/or the slider so that the fitting checker is not allowed to be detached from the body when the legs are closed. The legs are spread to release the claws from engagement with the body and/or the slider so that the fitting checker is allowed to be detached from the body. A plurality of releasing protrusions are formed to protrude from respective inside portions of the legs of the fitting checker. The releasing protrusions are pressed so that the legs are elastically deformed in respective spreading directions. A pressing portion is provided on the slider to press the releasing protrusions of the fitting checker to thereby spread the legs of the fitting checker when the pipe is inserted into the insertion hole to assume a normal fitting position so that the slider is displaced to a normal thrust position.

Before the pipe is inserted into the insertion hole of the main body, the pipe retainer is attached to the main body of the pipe so that the falling-off preventing protrusion protrudes through the window of the main body, confronting the interior of the main body. The slider is assembled into the main body with the pressed portion thereof inserted in the insertion hole. The fitting checker is attached to the main body and/or the slider with the legs thereof holding the main body. When the pipe is inserted into the insertion hole of the main body, the falling-off preventing flange presses the falling-off preventing protrusion outward so that the pipe retainer spreads. On the other hand, the pipe presses the pressed portion of the slider so that the overall slider is pushed into the insertion hole of the main body. When the pipe is further inserted into the main body to reach a normal depth, the falling-off preventing flange passes the falling-off preventing protrusion, so that the overall pipe retainer elastically returns to its former state. Consequently, the falling-off preventing flange engages the falling-off preventing protrusion such that the pipe is held so as to be prevented from falling off. Further, when the pipe reaches the normal depth, the pressing portion of the slider presses the disengaging protrusions of the fitting checker so that the legs of the latter spread. With the spreading of the legs, the fitting checker is released from the engagement with the main body such that it can be pulled out radially.

When the pipe is incompletely inserted into the insertion hole such that it does not reach the normal depth, the slider is also pushed into the insertion hole incompletely. As a result, the pressing portion of the slider cannot sufficiently spread the legs of the fitting checker, so that the fitting checker maintains the engaging state. Since the fitting checker cannot be pulled out of the main body, a workman understands that the pipe has been incompletely inserted into the main body.

Thus, whether the pipe has normally been inserted can be understood by determining whether the fitting checker can be pulled out. The fitting checker is attached to the main body of the pipe fitting from the outside without provision of the conventional opening. Consequently, a large opening is not left in the main body after confirmation of the normal insertion of the pipe and accordingly foreign matter such as dust can effectively be prevented from entering the main body of the pipe fitting.

BRIEF DESCRIPTION OF THE DRAWINGS

Other objects, features and advantages of the present invention will become clear upon reviewing the following description of the preferred embodiments, made with reference to the accompanying drawings, in which.

DETAILED DESCRIPTION OF THE PREFERRED EMBODIMENTS

Figure 1:
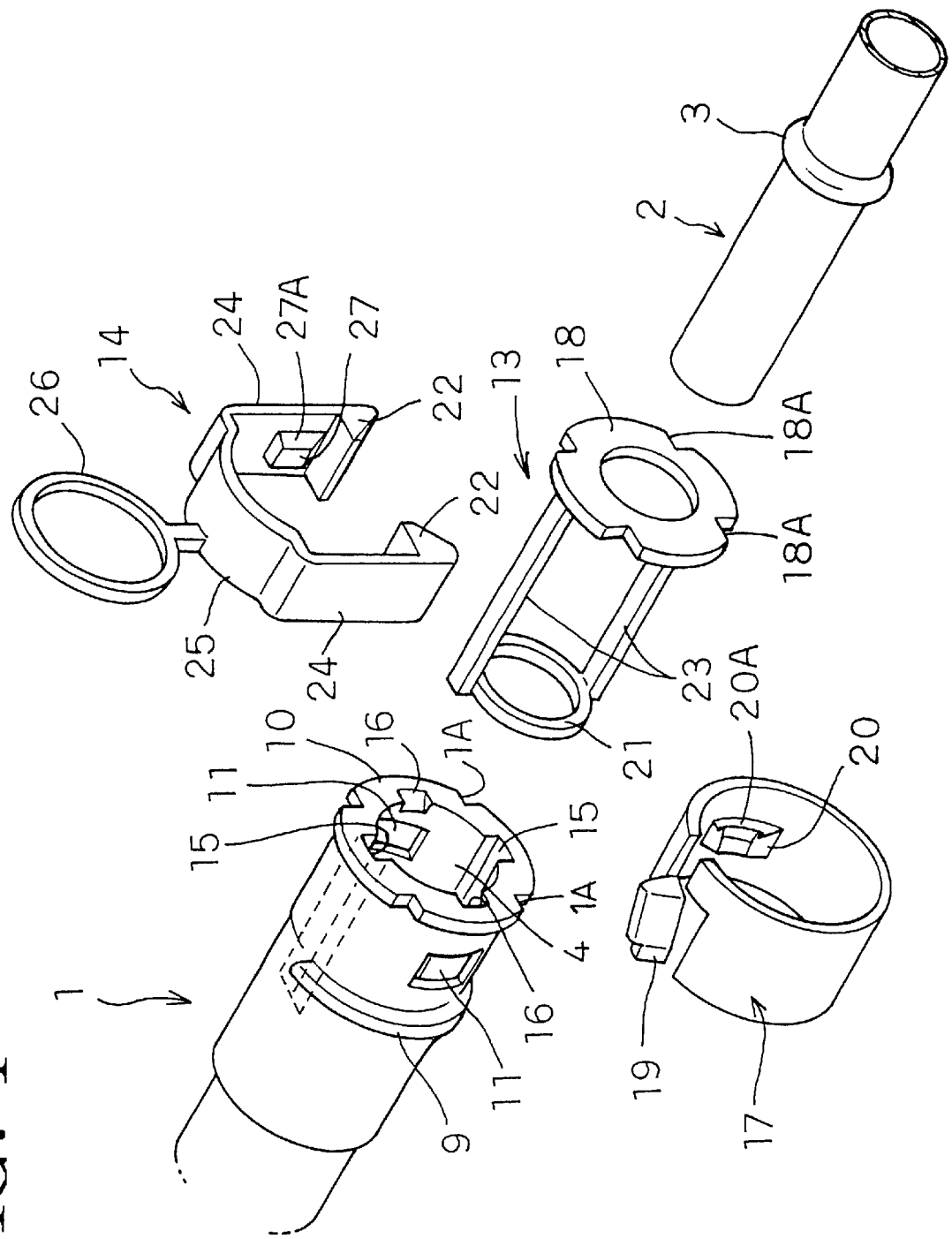
FIG. 1 is an exploded perspective view of a pipe fitting of a first embodiment in accordance with the present invention.
Figure 2:
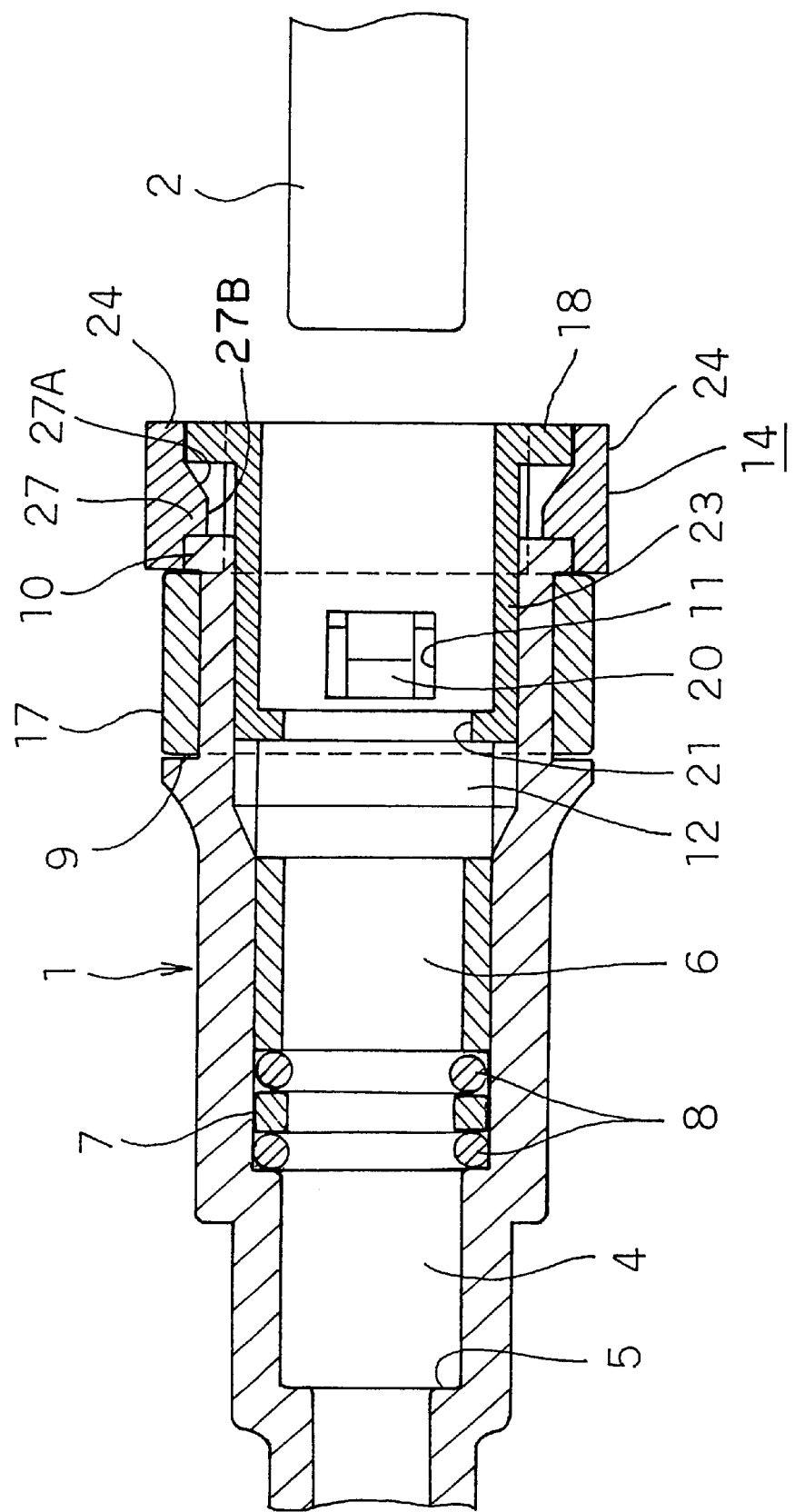
FIG. 2 sectional view of the pipe fitting, showing the state before a pipe is inserted therein.

A first embodiment of the present invention will be described with reference to FIGS. 1 to 8. Referring to FIG. 1, a pipe fitting of the first embodiment comprises a main body 1 made of a synthetic resin material. The main body 1 is formed into a generally cylindrical shape and has a distal end (not shown) with which, for example, a synthetic resin tube is to be fitted. The main body 1 is formed therein with an insertion hole 4 into which, for example, a metal pipe 2 is inserted. The pipe 2 has a falling-off preventing flange 3 formed along the overall circumference thereof by way of bulging. The insertion hole 4 has a stepped stopper face 5 formed on the middle of an inner wall thereof as shown in FIG. 2. A front end of the pipe 2 abuts the stopper face 5 when the pipe is inserted into the insertion hole 4, whereby the stopper face 5 defines an insertion limit position. The insertion hole 4 includes a middle section 6 formed nearer to an entrance thereof than the stopper face 5 or on the right of the stopper face 5 as viewed in FIG. 2. The middle section 6 has a larger diameter than the stopper face 5 portion. Two seal rings 8 are fitted in the middle section 6 with a spacer ring 7 being sandwiched therebetween. The seal rings 8 adhere closely to an outer circumference of the pipe 2, thereby sealing a gap between the pipe 2 and an inner circumferential wall of the insertion hole 4. The hole 4 further includes a leading or guiding section 12 formed between the entrance and the middle section 6 and has a larger inner diameter than the middle section. The falling-off preventing flange 3 can be inserted into the leading section 12. A pair of positioning grooves 15 for a slider 13, which will be described later, are formed in the inner wall of the main body 1 so as to be opposed to each other. Each positioning groove 15 extends inward from an entrance side end of the insertion hole 4 by a predetermined length. The main body 1 has another pair of grooves 16 located substantially perpendicularly to the positioning grooves 15. Each groove 16 extends from the entrance side end face of the insertion hole 4 to windows 11.

The main body 1 has a positioning flange 9 formed on an outer circumference thereof so as to extend circumferentially. The positioning flange 9 is provided for positioning a pipe retainer 17 which will be described later. Although the positioning flange 9 extends a part of the outer circumference of the main body 1 in FIG. 1, it may be formed along the overall outer circumference of the main body. The main body 1 further has a flange 10 formed along the overall circumferential end at the entrance side having substantially the same height as the flange 9. The flange 10 has four notches formed at intervals of 90 degrees. The lower notches as viewed in FIG. 1 serve as engaged grooves 1A which a fitting checker 14 engages as will be described later. The windows 11 are formed in portions of the outer circumference of the main body 1 between the flanges 9 and 10. The windows 11 are located substantially perpendicularly to the positioning grooves 15 and symmetrically about the axis of the main body 1.

A generally C-shaped pipe retainer 17 is fitted with the outer circumferential portion of the main body 1 between the flanges 9 and 10. The pipe retainer 17 is formed by cutting off a part of a ring so as to be elastically deformable in a spreading direction. The pipe retainer 17 is temporarily spread and attached so as to hold the main body 1 and thereafter caused to elastically return in a clamping direction to its former state, being fixed to the main body 1. The pipe retainer 17 includes an operating protrusion or knob 19 formed on an end of the cut portion thereof in order that the pipe retainer may easily be spread in the attachment to the main body 1. The pipe retainer 17 further has a pair of falling-off preventing protrusions 20 formed on an inner circumferential face thereof. One of the protrusions 20 is shown in FIG. 1. Each falling-off preventing protrusion 20 has a tapered or inclined front face 20A at the entrance side of the insertion hole 4. The front face 20A is tapered outward so that each falling-off preventing protrusion 20 is readily pushed up when the falling-off preventing flange 3 passes it.

The slider 13 has at one of opposite ends thereof a pressed portion 21 pressed by the falling-off preventing flange 3 of the pipe 2. The pressed portion 21 is formed into the shape of a ring and has an outer diameter so as to be slidable on the inner circumference of the leading section 12 and an inner diameter so that a portion of the pipe 2 except the flange 3 is inserted therethrough. The slider 13 has at the other end thereof a pressing portion 18 formed into the shape of a ring similar to that of the flange 10 of the main body 1. The pressing portion 18 has four notches or engaged grooves 18A formed on the outer circumference at the intervals of 90 degrees so as to match the grooves 1A, respectively. A fitting checker 14 engages two lower grooves 18A in FIG. 1 as will be described later, so that engaging claws 22 of the fitting checker engage both grooves 1A of the main body 1 and grooves 18A of the slider 13, respectively. The slider 13 further includes two axially extending connecting pieces 23 interconnecting the pressed portion 21 and the pressing portion 18. The connecting pieces 23 are adapted to be inserted into the positioning grooves 15 of the main body 1, respectively. When the slider 13 assumes a position at an initial stage of the assembly to the main body 1 as shown in FIG. 2, the pressing portion 18 is held at a position spaced outward from the end of the main body 1.

The fitting checker 14 includes a pair of legs 24, that are flexible so as to be able to part from each other and a curved piece 25 interconnecting upper ends of the legs 24. The fitting checker 14 further includes an operating ring 26 standing from an upper side of the curved piece 25 near one end of the latter. Each leg 24 has an engaging claw 22 formed on the lower inside thereof. The claws 22 of the legs 24 engage the grooves 1A and 18A of the main body 1 and the slider 13, respectively, as described above, so that the fitting checker 14 is mounted on both of the main body 1 and the slider 13 so as to not be allowed to be pulled out axially.

Figure 6:
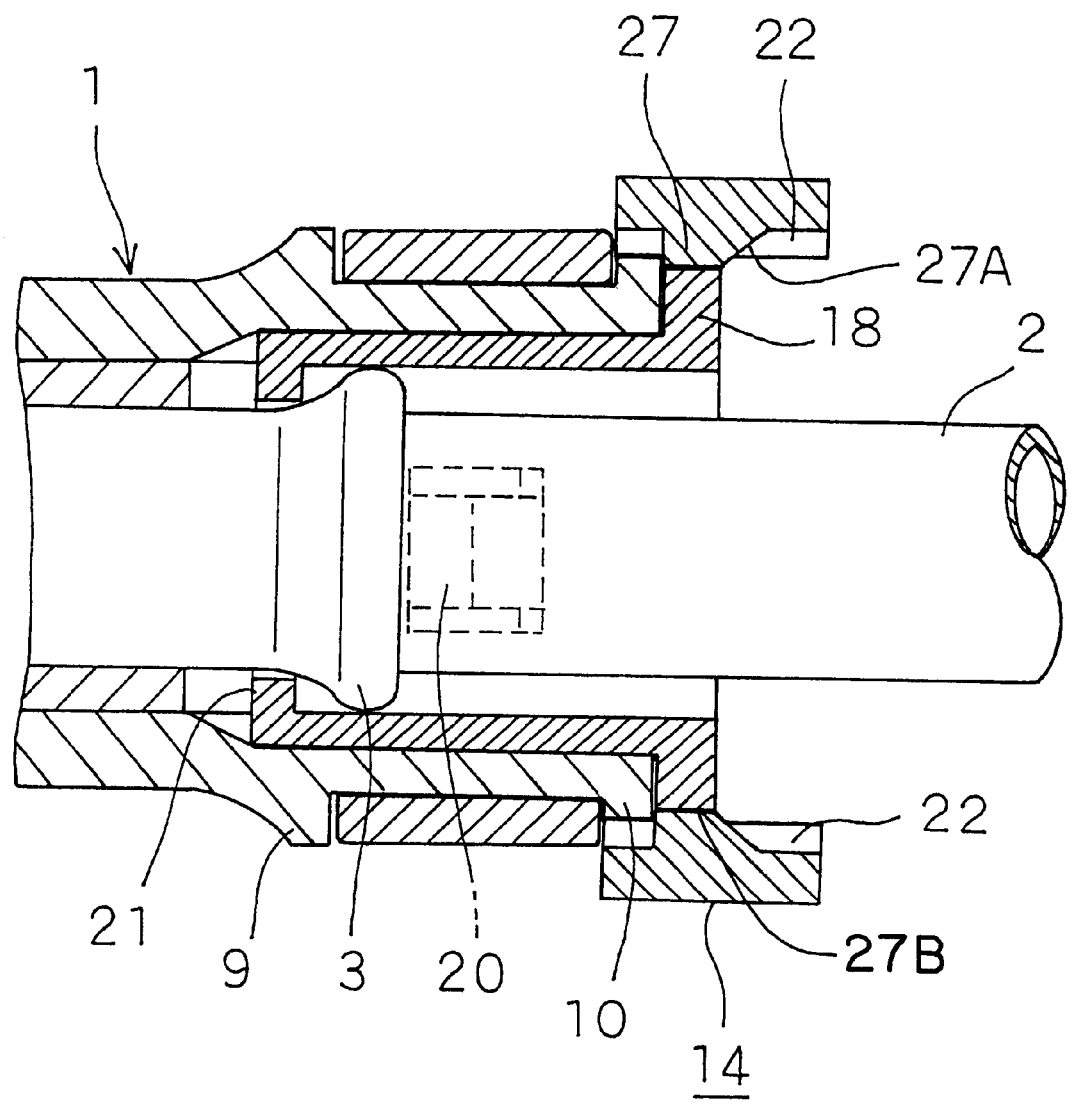
FIG. 6 is a transverse section of the pipe fitting in the state shown in FIG. 5.
Figure 7:
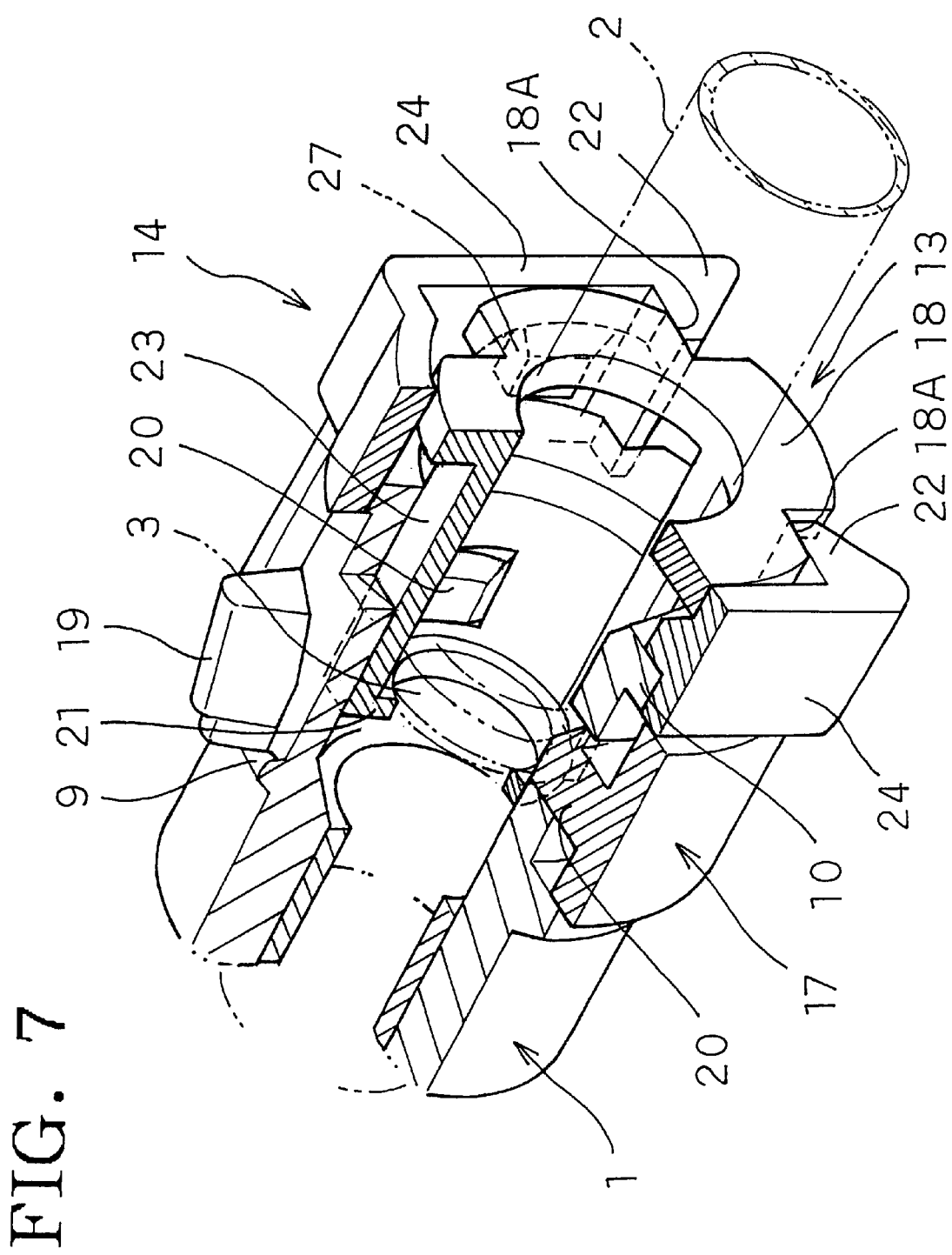
FIG. 7 is a partially broken perspective view of the pipe fitting, showing the state where the pipe fitting is being inserted.
Figure 8:
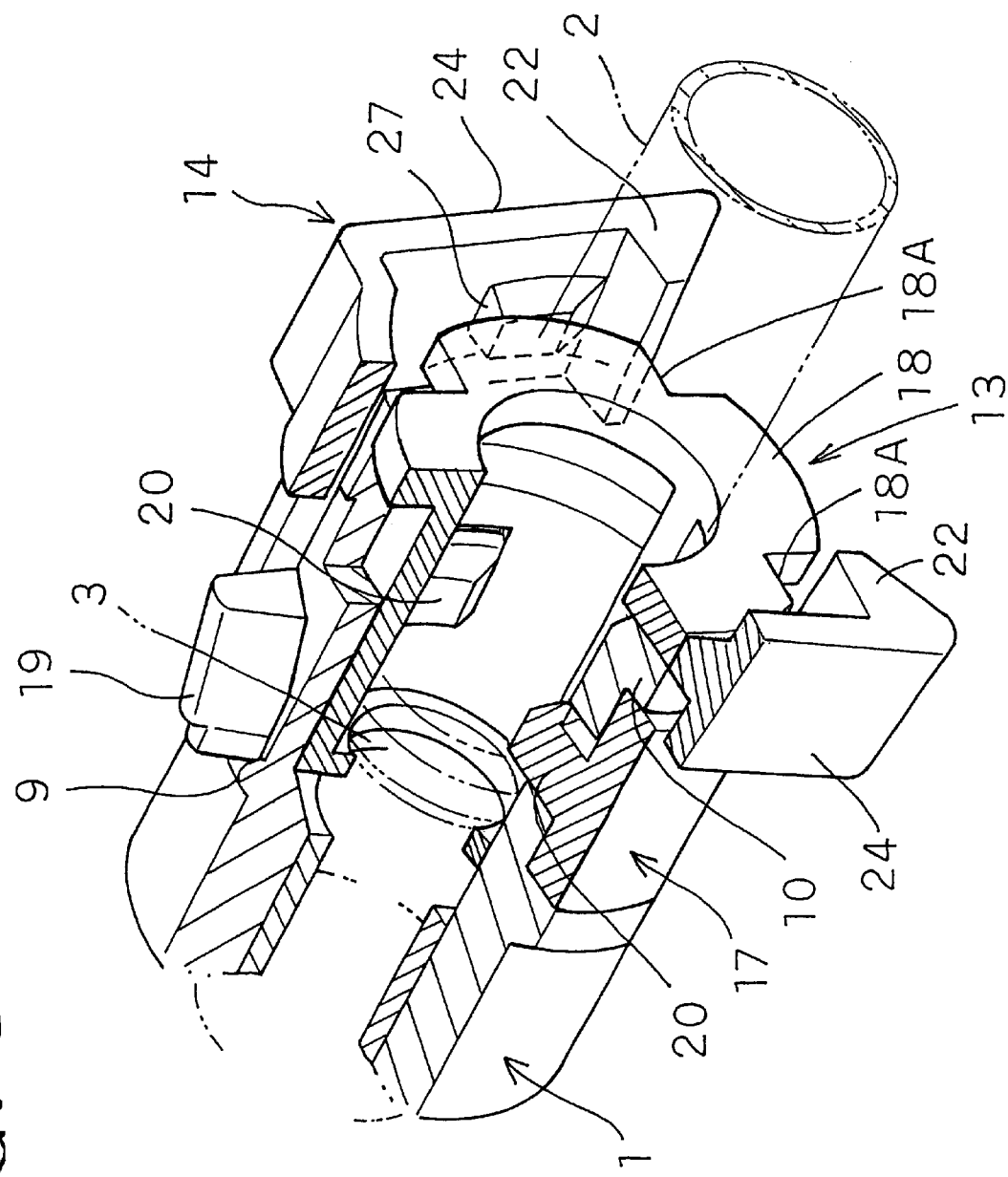
FIG. 8 is a partially broken perspective view of the pipe fitting, showing the state where the pipe fitting has completely been inserted.

Each leg 24 of the fitting checker 14 has a releasing protrusion 27 formed on the inside thereof so as to be located over the corresponding engaging claw 22. In the initial state of the fitting checker 14 as shown in FIG. 2, both protrusions 27 are located between the flange 10 of the main body 1 and the pressing portion 18 of the slider 13 so that the axial movement of the fitting checker 14 is limited. Further, the protrusions 27 have inclined front faces 27A, respectively, which faces are opposed to the pressing portion 18 of the slider 13. The inclined faces 27A are brought into sliding contact with the pressing portion 18 to thereby guide the respective legs 24 in a spreading operation. When the pipe 2 has been inserted in the insertion hole 4 to reach a normal depth thereof, the falling-off preventing flange 3 presses the pressed portion 21 of the slider 13 until completely passing the falling-off preventing protrusions 20. In this case, the edge of the pressing portion 18 of the slider 13 moves up onto tops 27B of the releasing protrusions 27 of the fitting checker 14 as shown in FIG. 6, when the legs 24 are spread the widest. Only when the legs 24 assume the above-described position are the claws 22 allowed to disengage from the respective grooves 1A and the respective grooves 18A. In other words, the fitting checker 14 can be pulled out only when the pipe 2 has been inserted to reach the normal depth thereof.

Figure 3:
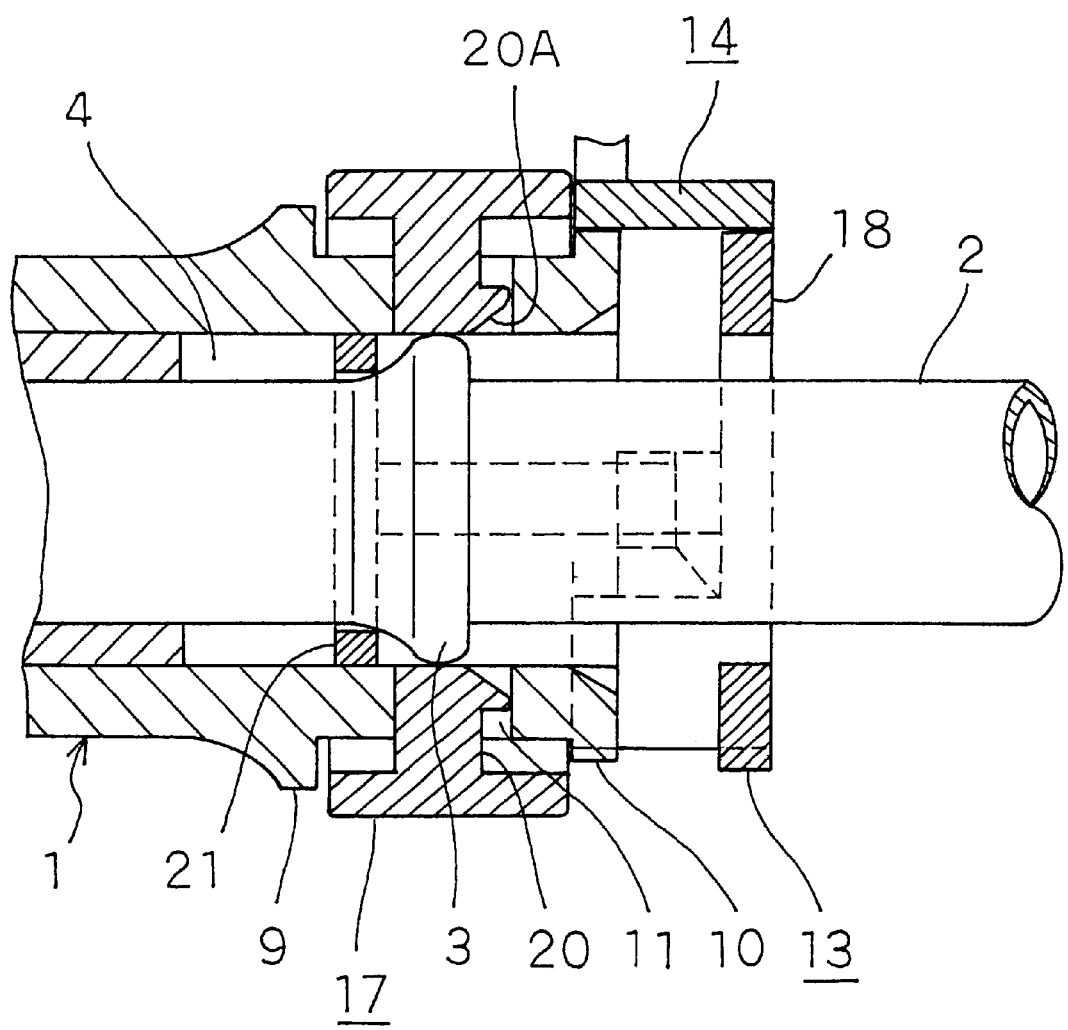
FIG. 3 is a longitudinal section of the pipe fitting, showing the state where the pipe is being inserted.
Figure 4:
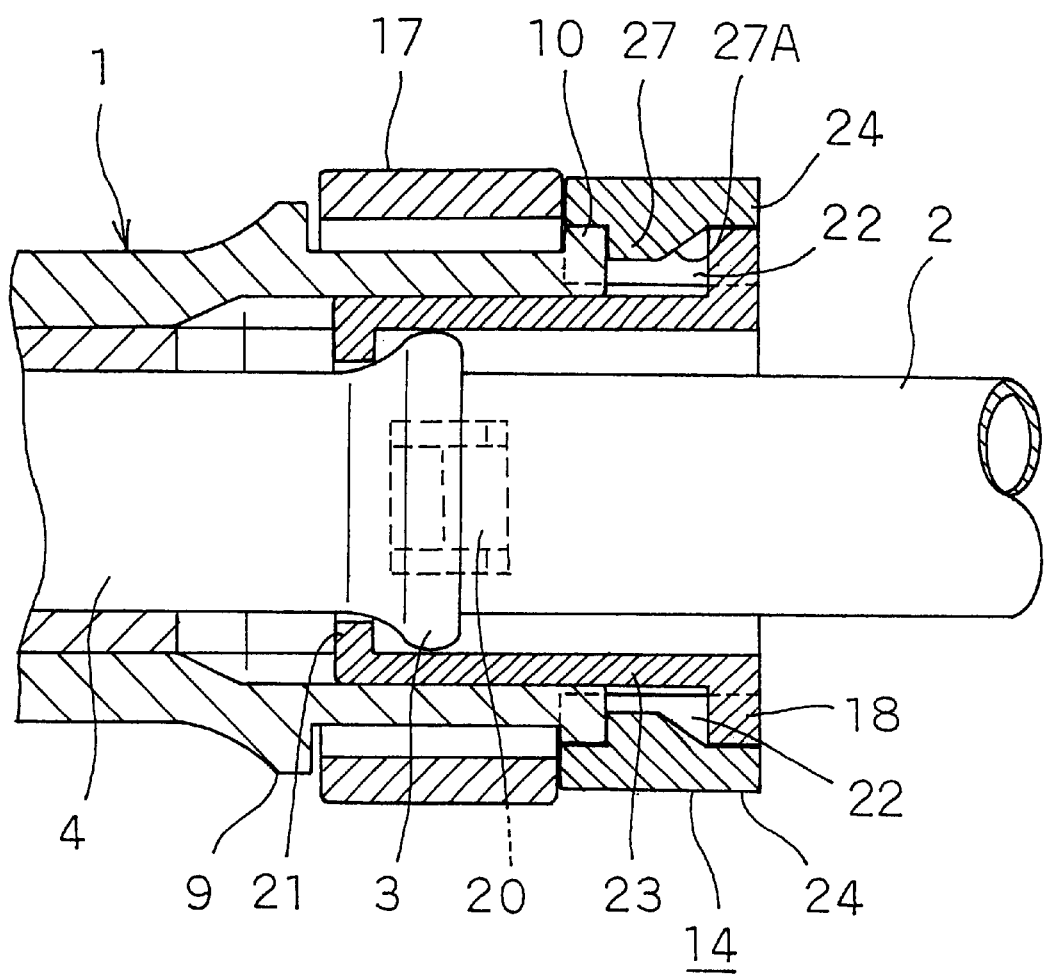
FIG. 4 is a transverse section of the pipe fitting in the state shown in FIG. 3.
Figure 5:
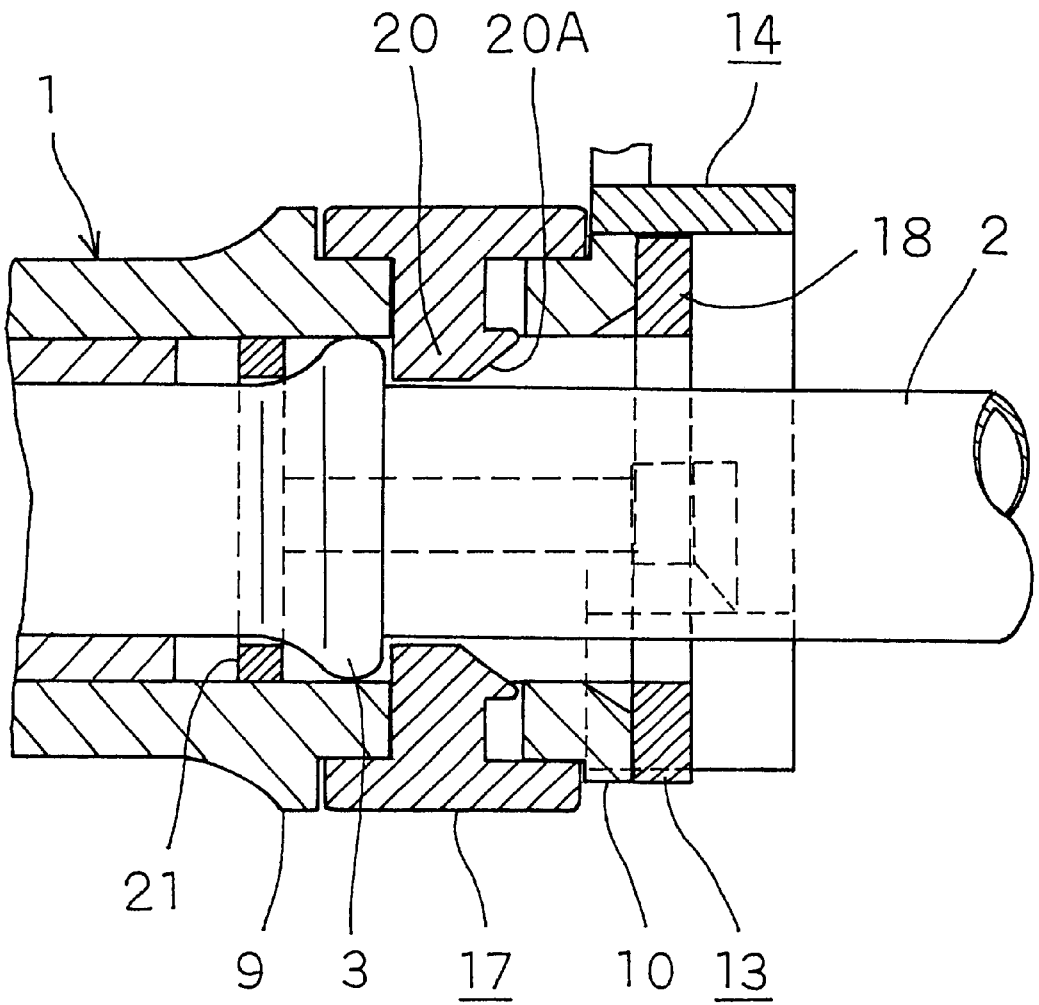
FIG. 5 is a longitudinal section of the pipe fitting, showing the state where the pipe fitting has been completely inserted.

The operation of the pipe fitting will be described. First, the slider 13, the fitting checker 14 and the pipe retainer 17 are assembled to the main body 1 as shown in FIG. 2. In this state, the pipe 2 is inserted into the insertion hole 4 from the entrance side of the latter. In the interim, the pipe 2 is moved forward with the flange 3 sliding along the inner wall of the insertion hole 4. The flange 3 then abuts the falling-off preventing protrusions 20 of the pipe retainer 17 projecting through the respective windows into the insertion hole 4 as shown in FIGS. 3 and 4. The pipe retainer 17 is spread by the guiding of the tapered faces 20A of the protrusions 20 so that the protrusions 20 are moved outward. The flange 3 passes the protrusions 20 when the pipe 2 is further inserted into the insertion hole 4. As a result, the pipe retainer 17 elastically returns to its former state such that the protrusions 20 are re-thrust into the insertion hole 4. This engages both protrusions 20 with the flange 3, whereby the pipe 2 is held so as to be prevented from falling off. This state is referred to as a normally inserted state as shown in FIGS. 5 and 6.

The flange 3 presses the pressed portion 21 of the slider 13 when passing the protrusions 20. As a result, the slider 13 is thrust from a position shown in FIG. 4 to a position shown in FIG. 6. During this thrust, the pressing portion 18 of the slider 13 is brought into sliding contact with the inclined faces 27A of the respective releasing protrusions 27 so that the legs 24 of the fitting checker 14 are gradually spread. When the pipe 2 is inserted to thereby assume the aforesaid normally inserted state, the edge of the pressing portion 18 moves up onto the tops 27B of the releasing protrusions 27 as shown in FIG. 6, where the legs 24 are spread the widest. The claws 22 of the fitting checker 14 are released from the engagement with the respective grooves 1A of the main body 1 and the respective grooves 18A of the slider 13 in this way. Accordingly, the fitting checker 14 can be pulled out when the operating ring 26 is drawn radially outward. By the fact that the fitting checker 14 is pulled out, the workman can find that the pipe 2 has been inserted to reach the normal depth thereof.

The spreading of the legs 24 by the pressing portion 18 is insufficient when the pipe 2 has been inserted but has not reached the normal depth thereof. Consequently, the claws 22 are not released from the engagement with the grooves 1A and 18A completely. Accordingly, the fitting checker 14 cannot be pulled out even when the operating ring 26 is drawn, and the workman finds that the pipe 2 has been inserted incompletely.

According to the above-described embodiment, whether the pipe 2 has normally been inserted can be understood by finding out whether the fitting checker 14 can be pulled out. The fitting checker 14 is attached to the main body of the pipe fitting from outside without provision of the conventional opening. Consequently, a large opening is not left in the main body 1 after the check of normal insertion of the pipe 2 and accordingly, foreign matter such as dust can effectively be prevented from entering the main body 1 of the pipe fitting. Further, the claws 22 of the fitting checker 14 engage the respective grooves 1A of the main body 1 and the respective grooves 18A of the slider 13. Consequently, the fitting checker 14 can be prevented from inadvertent detachment, and accordingly the reliability of the checking function of the fitting checker 14 can be improved.

Although the main body 1 has the open windows through which the falling-off preventing protrusions 20 of the pipe retainer 17 are respectively inserted, the windows are closed as the result of attachment of the pipe retainer 17. Consequently, foreign matter such as dust can be prevented from entering the main body 1 through the windows.

FIGS. 9 to 14 illustrate a second embodiment of the invention. The claws 22 of the fitting checker 14 engage both the main body 1 and the pressing portion 18 of the slider 13 in the foregoing embodiment. In the second embodiment, however, the claws 22 engage only the main body 1 of the pipe fitting. Each of the main body 1 and the pipe retainer 17 has the same construction as that in the foregoing embodiment. Accordingly, the identical or similar parts in the second embodiment are labeled by the same reference symbols as in the first embodiment and the description of these parts will be eliminated.

The pressing portion 18 of the slider 13 has no engaged grooves and is formed into an annular shape. An outer diameter of the pressing portion 18 is larger than the diameter of the insertion hole 4 and an inner diameter of the fitting checker 14. The pressing portion 18 of the slider 13 is disposed outside the main body 1 and the fitting checker 14.

Figure 9:
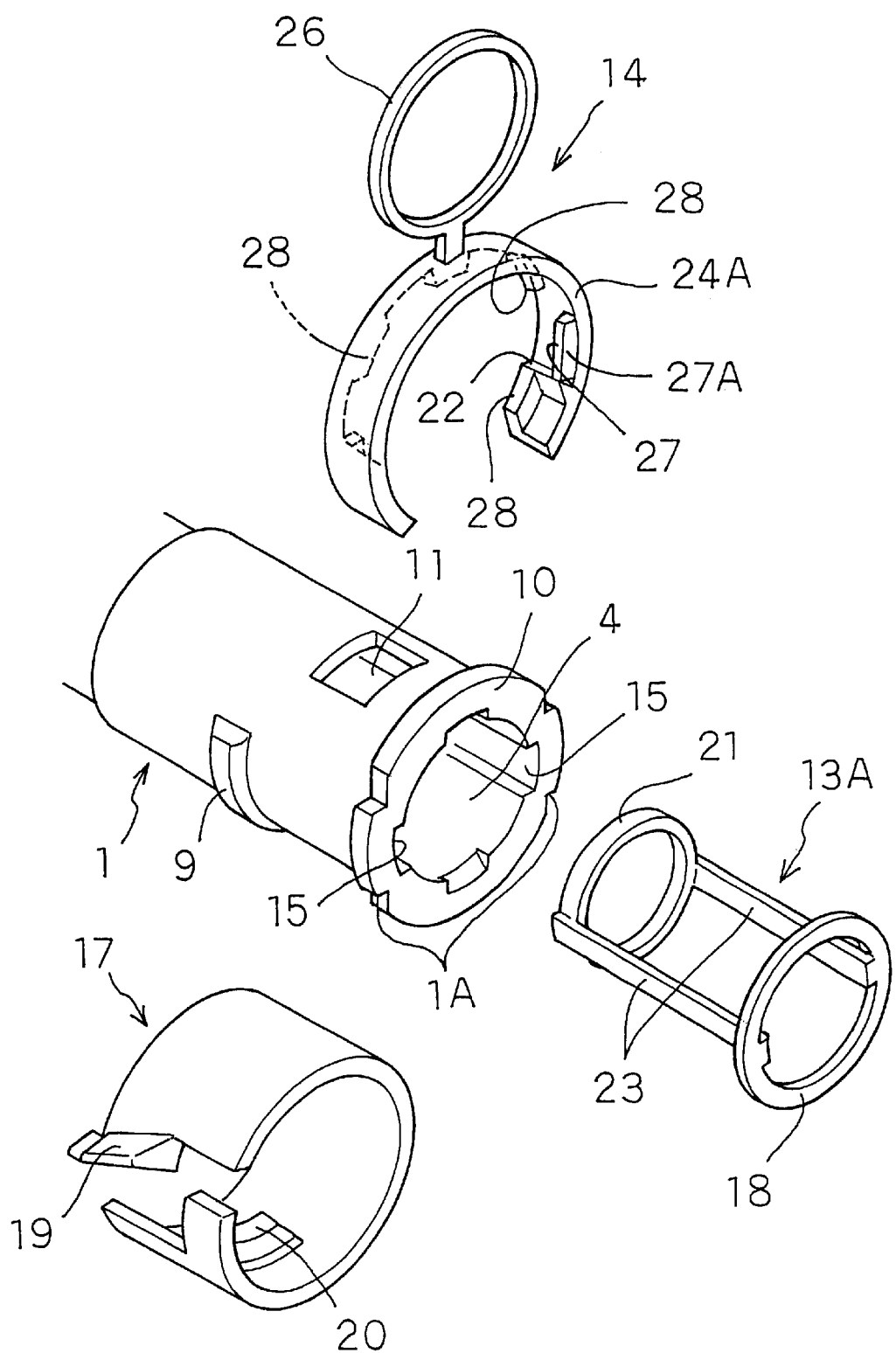
FIG. 9 is an exploded perspective view of the pipe fitting of a second embodiment in accordance with the present invention.
Figure 10:
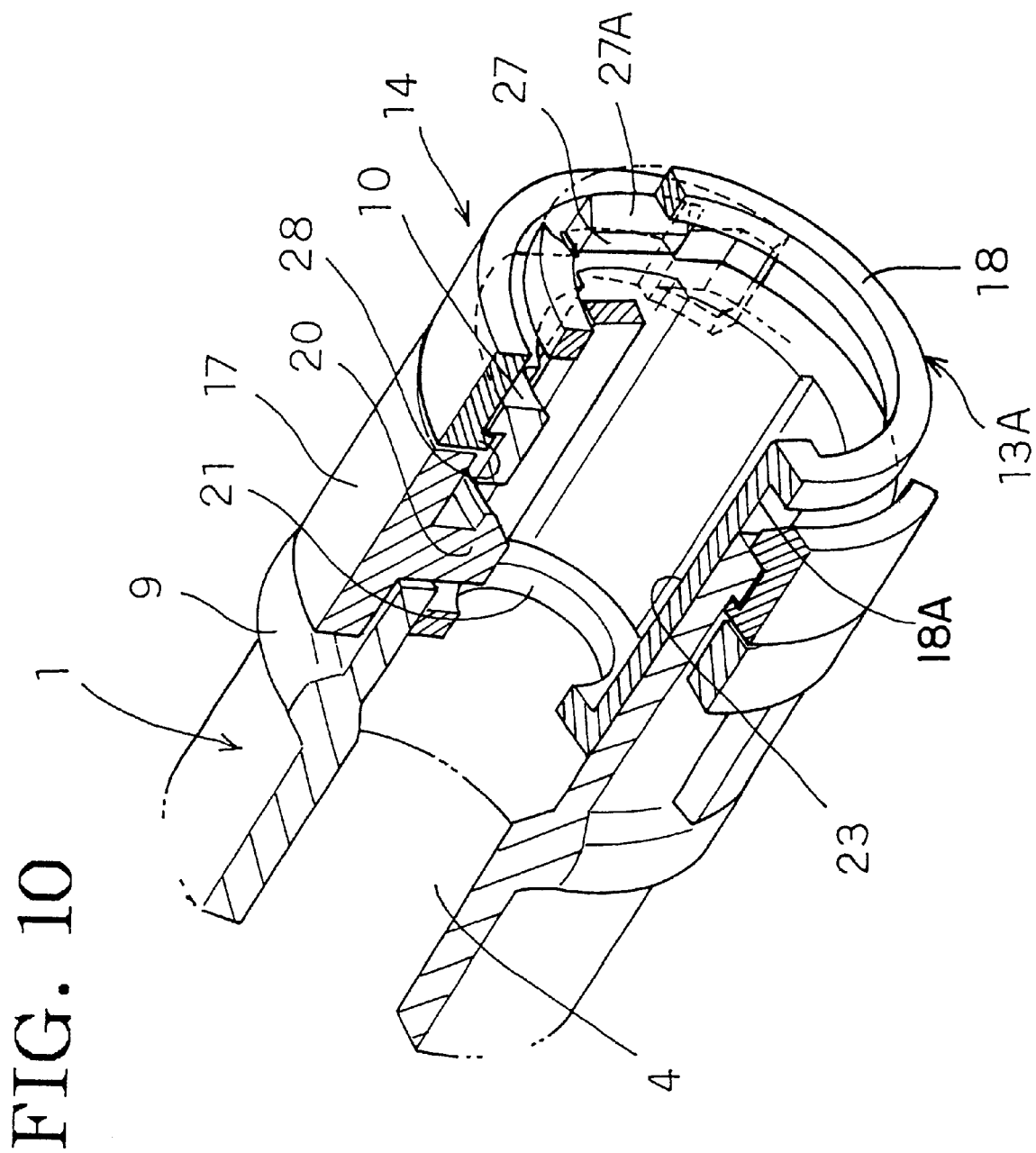
FIG. 10 is a partially broken perspective view of the pipe fitting, showing the state before the pipe fitting is inserted.

The fitting checker 14 includes legs 24A integrally formed into the shape of an arc so that the fitting checker is fitted with the outer circumference of the flange 10 of the main body 1. Each leg 24A has a width larger than the flange 10. The fitting checker 14 has a plurality of limiting edges 28 formed on one of two inner circumferential edges of the legs 24A so as to protrude radially inward. The limiting edges 28 engage an axial inside face of the flange 10. The fitting checker 14 further has a pair of releasing protrusions 27 formed on the other inner circumferential edges of the legs 24A near distal ends of the legs. One of the releasing protrusions 27 is shown in FIG. 9. The releasing protrusions 27 are pushed up by the pressing portion 18 of the slider 13 when the pipe 2 has been inserted to reach the normal depth and the slider 13A has been thrust into a predetermined position. For the purpose of a smooth pushing operation, each releasing protrusion 27 has an inclined front face 27A. The remaining construction of the pipe fitting of the second embodiment is the same as that in the foregoing embodiment.

Figure 11:
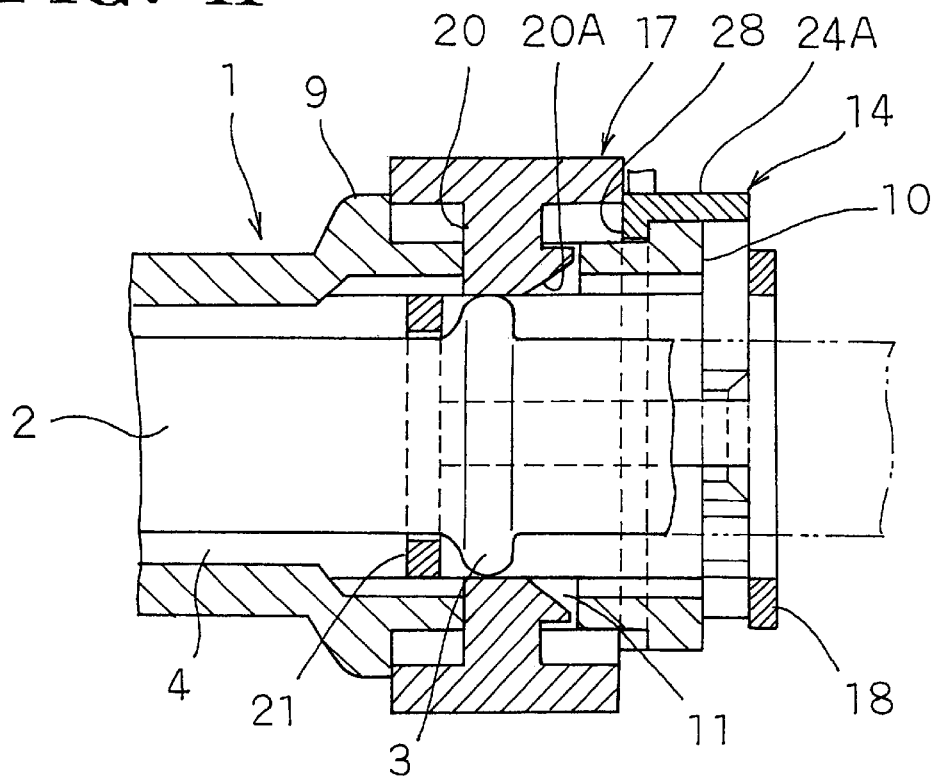
FIG. 11 is a longitudinal section of the pipe fitting, showing the state where the pipe is being inserted.
Figure 12:
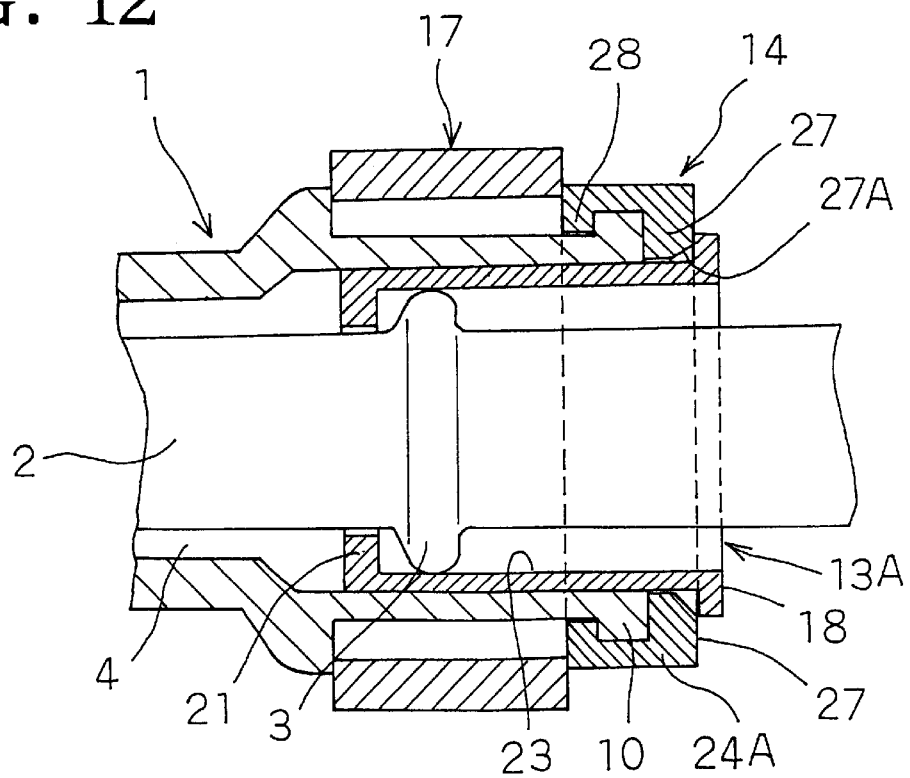
FIG. 12 is a transverse section of the pipe fitting in the state shown in FIG. 11.
Figure 13:
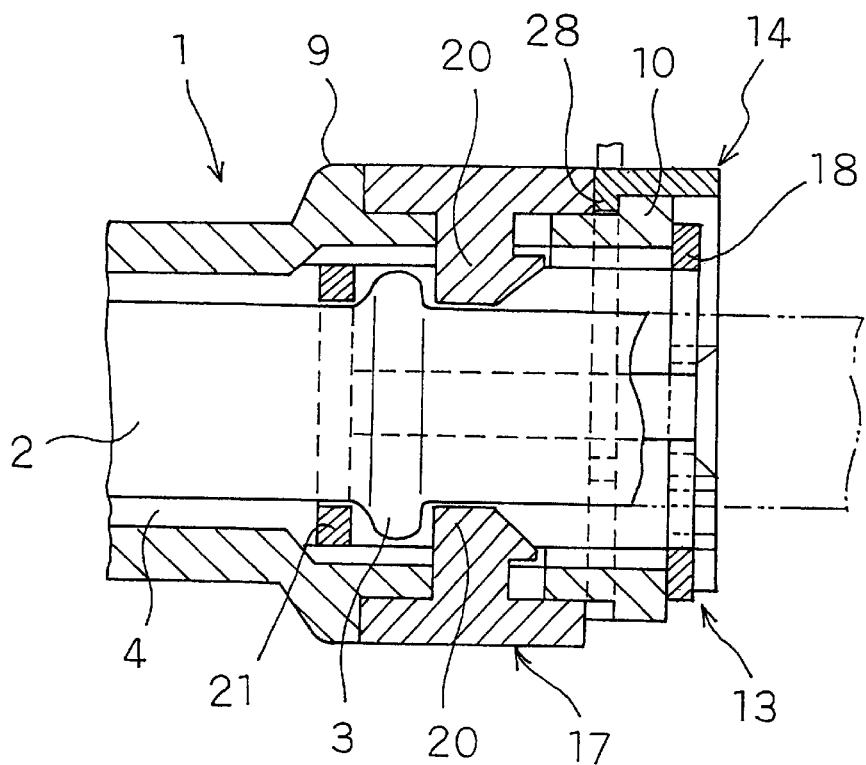
FIG. 13 is a longitudinal section of the pipe fitting into which the pipe is normally inserted.

The operation of the pipe fitting of the second embodiment will now be described. Upon insertion of the pipe 2 into the insertion hole 4 with the fitting checker 14 engaging the main body 1, the falling-off preventing flange 3 abuts both falling-off preventing protrusions 20 of the pipe retainer 17. The pipe retainer 17 is spread by the guiding of the tapered faces 20A of the protrusions 20 so that the protrusions 20 are moved outward, as shown in FIGS. 11 and 12. The flange 3 passes the protrusions 20 when the pipe 2 is further inserted into the insertion hole 4 to thereby assume the normal insertion position. As a result, the pipe retainer 17 elastically returns to its former state such that the protrusions 20 engage the flange 3, whereby the pipe 2 is held in a state prevented from falling off.

Figure 14:
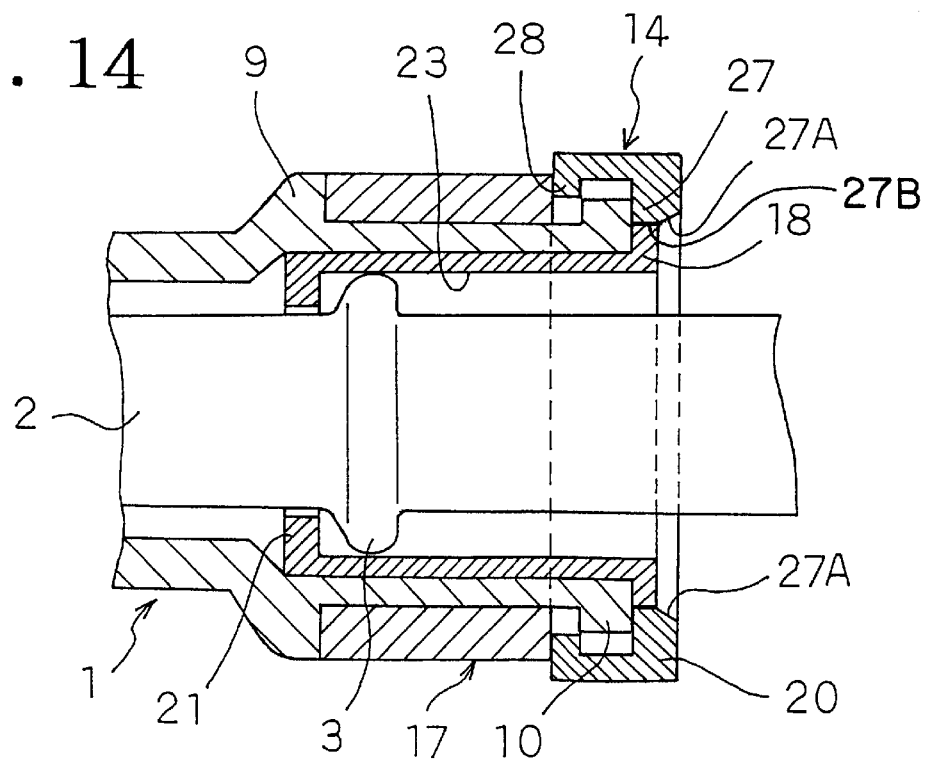
FIG. 14 is a transverse section of the pipe fitting in the state shown in FIG. 13.

The flange 3 presses the pressed portion 21 of the slider 13A when passing the protrusions 20. As a result, the slider 13A is displaced to a position shown in FIG. 13 or 14. During the displacement, the pressing portion 18 of the slider 13A is brought into a sliding contact with the inclined faces 27A of the releasing protrusions 27 so that the legs 24A of the fitting checker 14 are gradually spread. When the pipe 2 reaches the aforesaid normal insertion position, the outer circumferential edge of the pressing portion 18 moves up the tops 27B of the releasing protrusions 27 as shown in FIG. 14, where the legs 24A are spread the widest. The claws 22 of the fitting checker 14 are released from the engagement with the respective grooves 1A of the main body 1 and the respective grooves 18A of the slider 13A in this way. Accordingly, the fitting checker 14 can be pulled out when the operating ring 26 is drawn radially outward. By the fact that the fitting checker 14 is pulled out, the workman can find that the pipe 2 has been inserted to reach the normal depth thereof.

When the pipe 2 has been inserted but has not reached the normal depth thereof, the thrust of the slider 13A is insufficient such that the releasing protrusions 27 are not moved up by the pressing portion 18. Consequently, the claws 22 are not released from the engagement with the grooves 1A and 18A completely. Accordingly, the fitting checker 14 cannot be pulled out.

In the second embodiment, too, whether the pipe 2 has normally been inserted can be understood by finding out whether the fitting checker 14 can be pulled out. Further, since the main body 1 has no conventional opening, foreign matter such as dust can effectively be prevented from entering the main body 1 of the pipe fitting.

Figure 15:
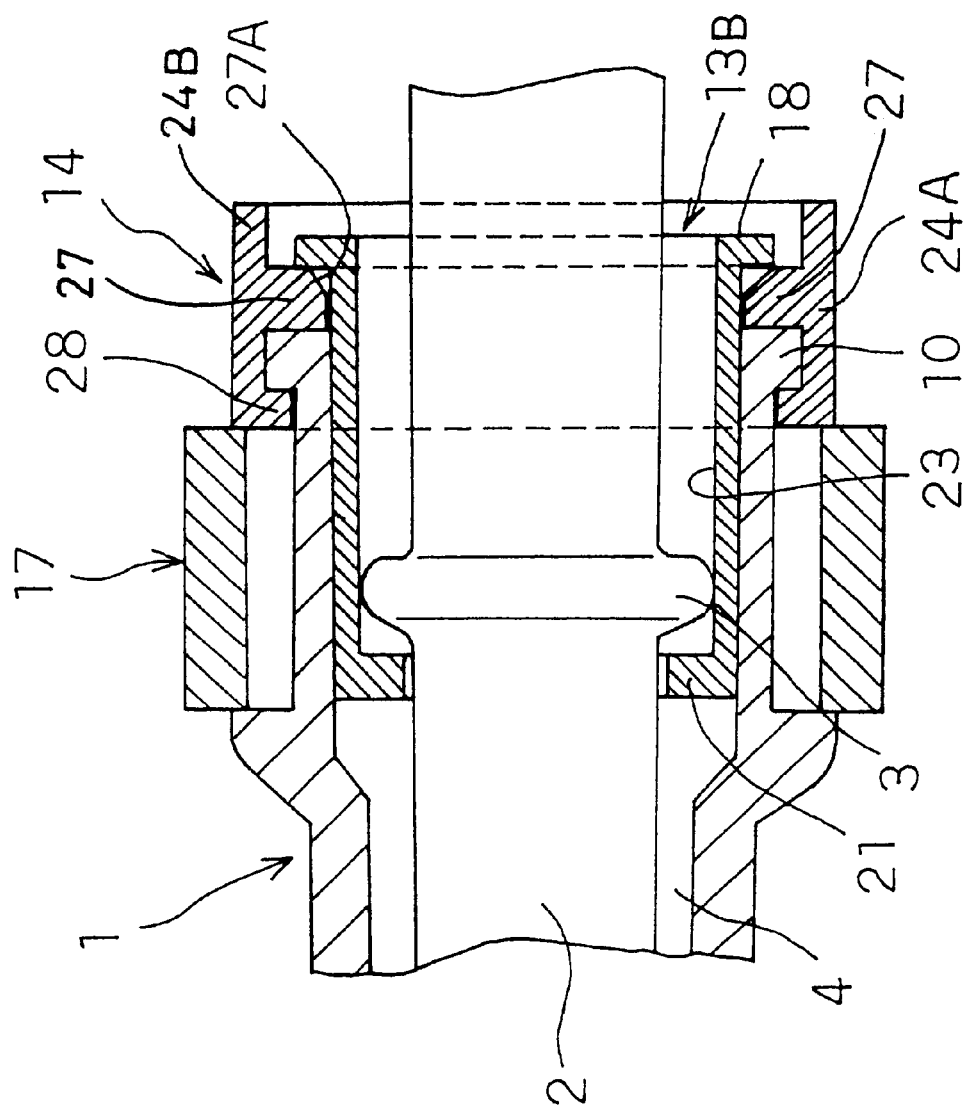
FIG. 15 is a partial sectional view of the pipe fitting of a third embodiment in accordance with the present invention.
Figure 16:
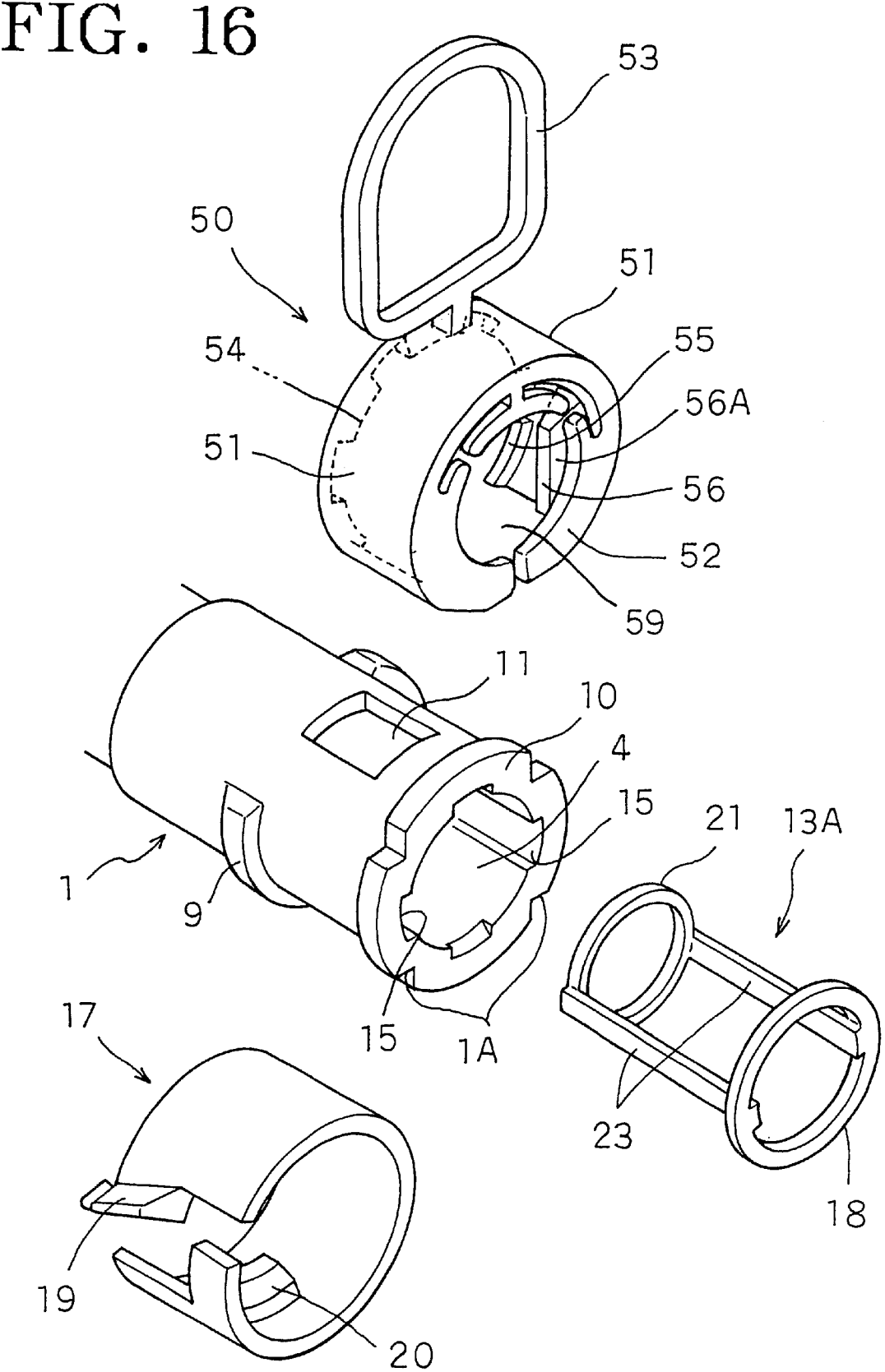
FIG. 16 is an exploded perspective view of the pipe fitting of a fourth embodiment in accordance with the present invention.
Figure 17:
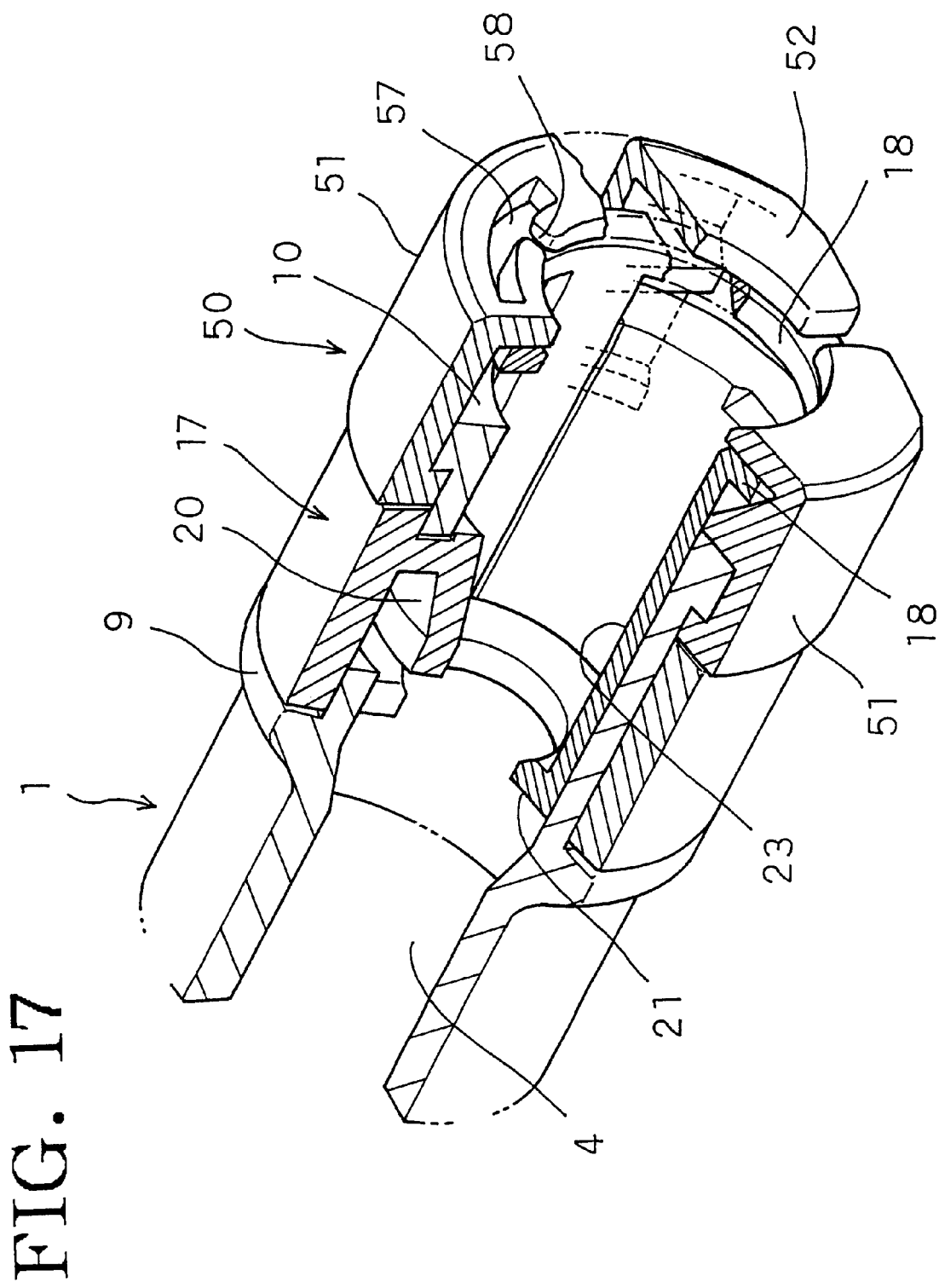
FIG. 17 is a partially broken perspective view of the pipe fitting, showing the state before the pipe fitting is inserted.

FIG. 15 illustrates a third embodiment of the invention. In the third embodiment, the rear edge of the fitting checker 14 extends to the rear of the releasing protrusions 27, thereby serving as an annular protecting edge 24B. When the fitting checker 14 has been attached to the main body 1, the protecting edge 24B projects to the rear of the pressing portion 18 of the slider 13B.

As the result of the above-described construction, the number of occasions where the slider 13B is subjected to a direct external force can be reduced, and accordingly the slider 13B can be prevented from being inadvertently thrust deep into the main body 1. The remaining construction of the pipe fitting of the third embodiment is the same as that of each of the first and second embodiments. Consequently, the same effect can be achieved from the third embodiment as from the first and second embodiments.

FIGS. 16 to 24 illustrate a fourth embodiment of the invention. In the fourth embodiment, a protector 52 is provided for preventing the slider 13A from being inadvertently thrust into the legs 51 of the fitting checker 50. More specifically, since the engagement portion of the slider is exposed at the rear end thereof in each of the foregoing embodiments, there is a possibility that the pipe may not be inserted along the axis of the insertion hole. If the pipe should be inserted obliquely into the insertion hole, the distal end of the pipe would abut the engagement portion of the slider. In this case, the slider is thrust in so that the legs of the fitting checker spread, whereupon the engaging claws of the fitting checker disengage from the main body 1 side. There is no problem in a case where each of the legs returns to its former state when the pipe is re-inserted into the insertion hole. However, each leg cannot sometimes return to its former state when the claws have got over respective normal positions. In this case, the fitting checker can be pulled out even if the re-insertion of the pipe is incomplete. Accordingly, the workman may erroneously determine that the pipe has normally been inserted.

The fourth embodiment is directed to a solution of the above-described problem, namely, to a more reliable detection of the incomplete insertion of the pipe. The pipe fitting of the fourth embodiment has the same construction as that of the second embodiment, except for the fitting checker 50. Accordingly, identical or similar parts in the fourth embodiment are labeled by the same reference symbols as in the second embodiment and the description of these parts will be eliminated.

The fitting checker 50 includes legs 51 integrally formed into the shape of an arc so that the fitting checker is fitted with the outer circumference of the flange 10 of the main body 1. Each leg 51 has a width sufficiently larger than the flange 10. The operating ring 53 stands from an upper central portion near one end of the fitting checker 50. The fitting checker 14 has a plurality of limiting edges 54 formed on the inner circumferential edge of each leg 51 at the operating ring 53 side so as to protrude radially inward. The limiting edges 54 engage an axial inside face of the flange 10. The limiting edges 54 have engaging claws 55 formed on distal ends thereof, respectively. The claws 55 engage the grooves 1A of the main body 1. Further, the fitting checker 50 has a pair of pressed portions 56 formed on the inner circumferential edge portions of the legs 51 at the side opposed to the limiting edges 54 near distal ends of the legs, respectively. Both pressed portions 56 are pushed up by the pressing portion 18 of the slider 13 when the pipe 2 has been inserted to reach the normal depth and the slider 13A has been thrust into a predetermined position. For the purpose of a smoothed pushing operation, the pressed portions 56 have inclined front faces 56A respectively.

Figure 18:
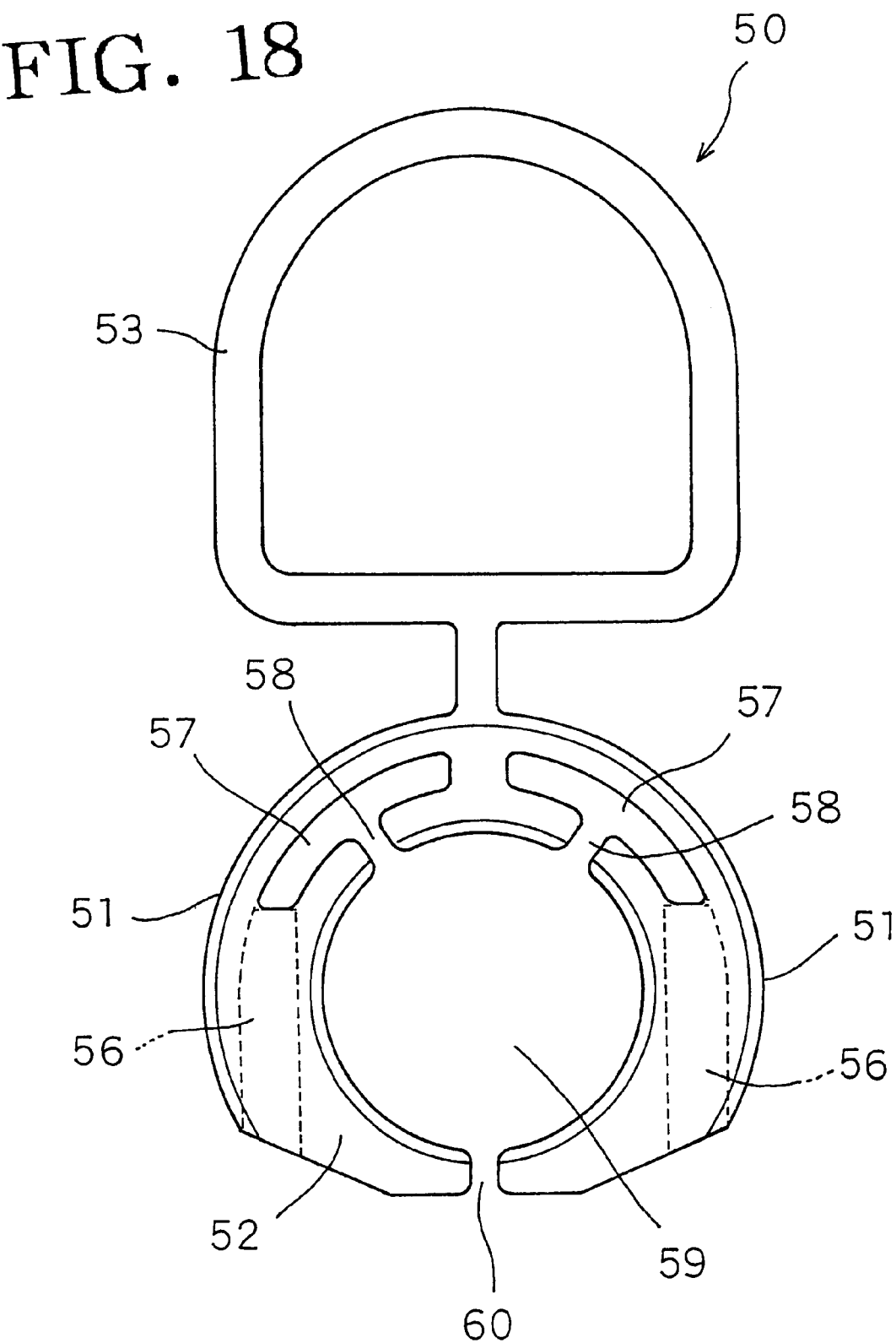
FIG. 18 is a front view of a fitting checker.
Figure 19:
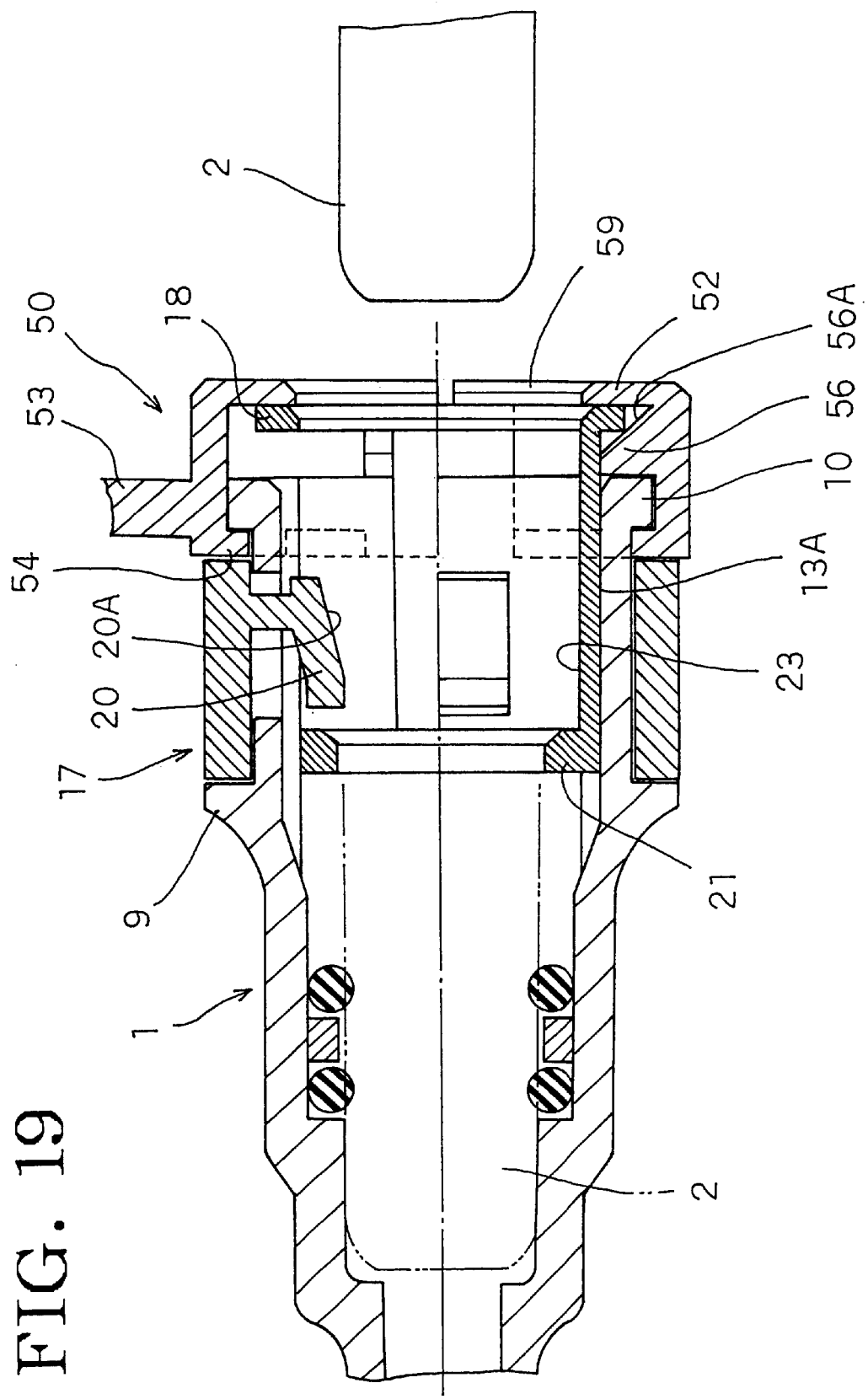
FIG. 19 is a longitudinal section of the pipe fitting, showing the state before the pipe is inserted therein.
Figure 20:
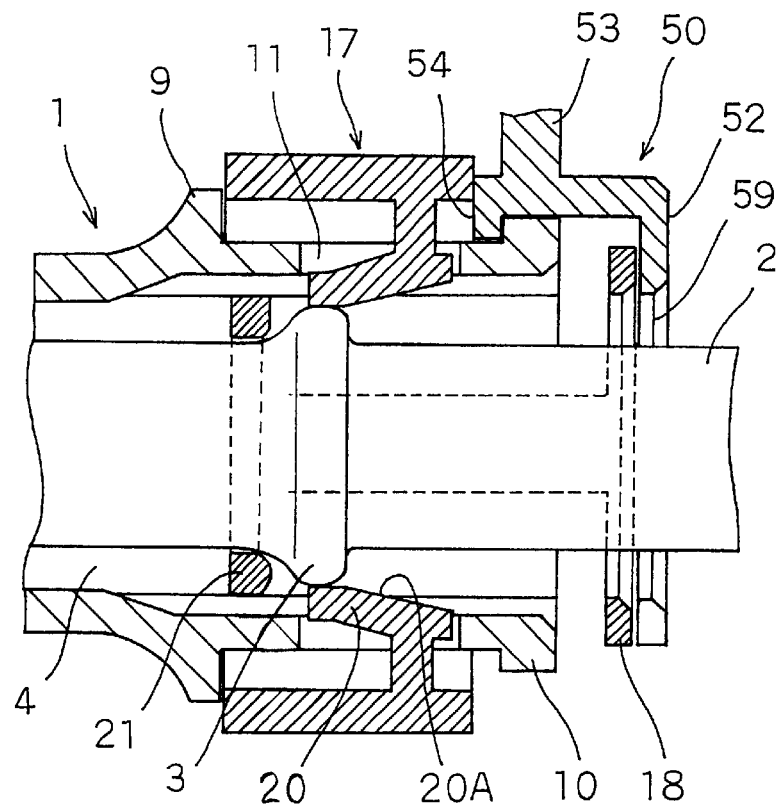
FIG. 20 is a longitudinal section of the pipe fitting, showing the state where the pipe is being inserted.
Figure 21:
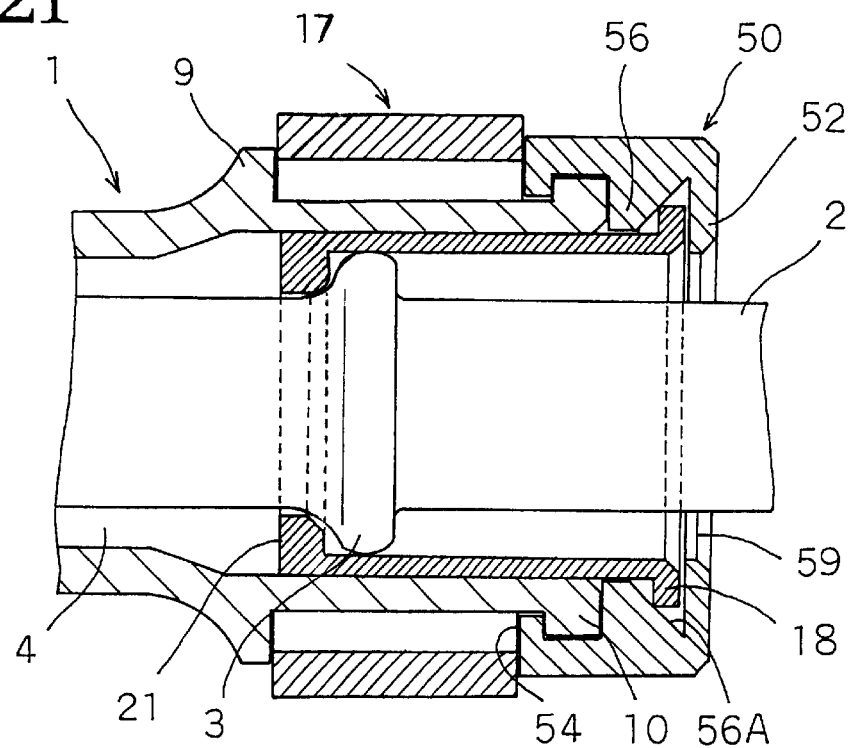
FIG. 21 is a transverse section of the pipe fitting in the state shown FIG. 20.
Figure 22:
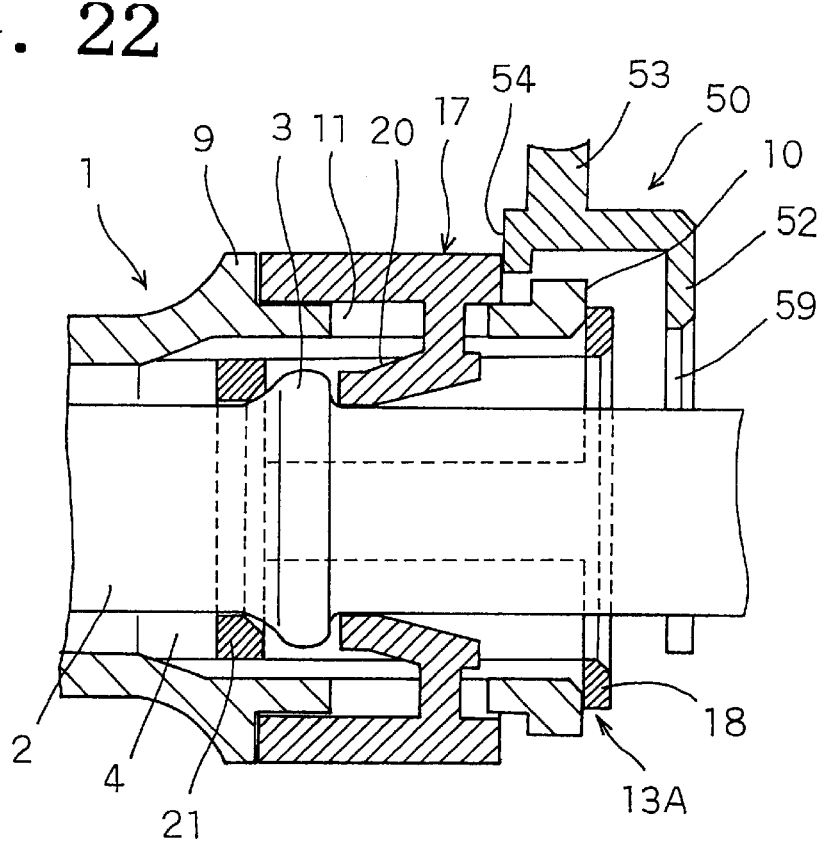
FIG. 22 is a longitudinal section of the pipe fitting into which the pipe is normally inserted.
Figure 23:
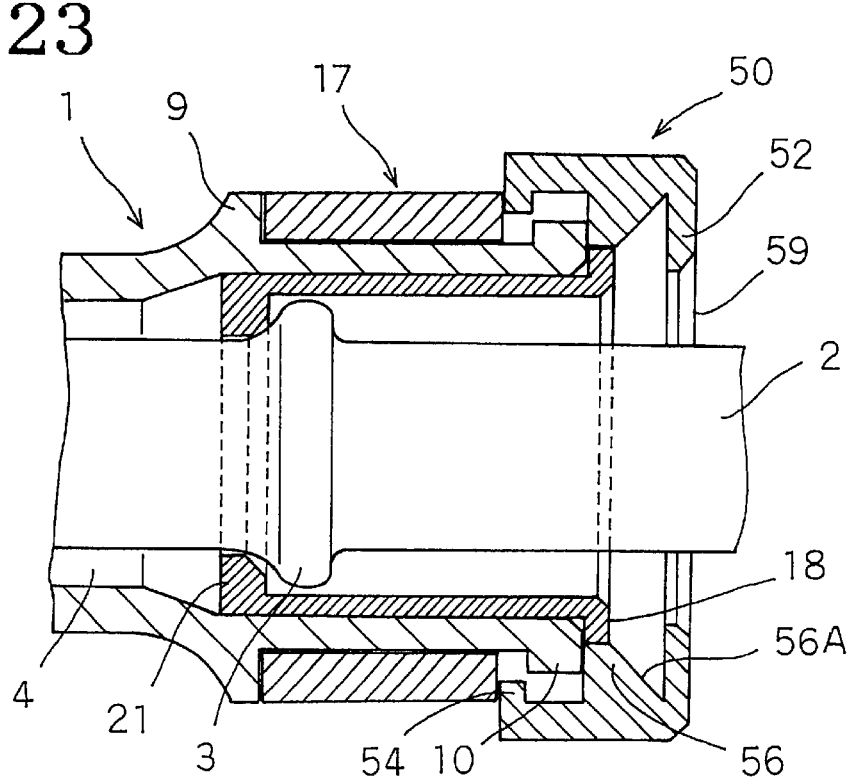
FIG. 23 is a transverse section of the pipe fitting in the state shown in FIG. 22.

The fitting checker 50 has the protector 52 formed to inwardly project out of the circumferential edge opposed to the limiting edges 54, as shown in FIG. 18. In order that the overall fitting checker 50 may be allowed to spread, a central lower portion of the protector 52 is cut out as shown at 60 in FIG. 18, and two upper symmetrical regions thereof, each of which has a predetermined angular range, are cut off as shown at 57 in FIG. 18. Further, two portions between the respective cut-off portions 57 and a central circular hole 59 are cut out as shown at 58 in FIG. 18. Consequently, the protector 52 is split into three pieces. The central hole 59 has an inner diameter set so that the flange 3 of the pipe 2 can be loosely inserted therethrough. The protector 52 is located outside the pressing portion 18 of the slider 13A in a state where the fitting checker 50 is attached to the main body 1. Particularly in this embodiment, the protector 52 is located so as to closely adhere to the pressing portion 18 outside the latter. The protector 52 has a width set so that the protector covers the pressing portion 18 substantially over the entire circumference.

When the pipe 2 is inserted along the axis of the insertion hole 4, the connecting work is carried out in the same manner as described in the second embodiment. The fitting checker 50 can be pulled out when the pipe 2 has been inserted into the insertion hole 4 to reach the normal depth thereof. When the pipe 2 has been incompletely inserted into the insertion hole 4 such that it does not reach the normal depth, the fitting checker 50 cannot be pulled out, whereby the workman finds that the pipe 2 has been incompletely inserted.

Figure 24:
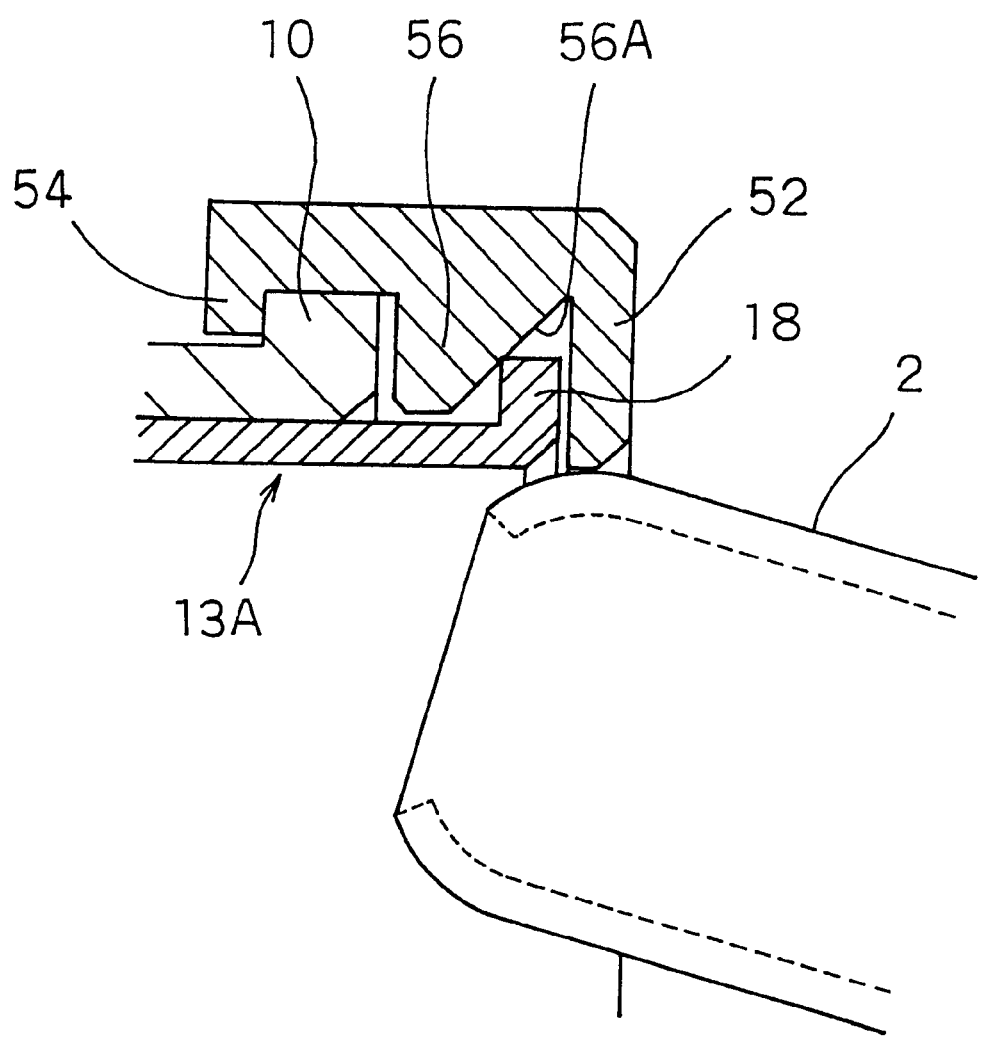
FIG. 24 is an enlarged sectional view of the pipe fitting, showing the case where the pipe is inserted at an angle.

When the pipe 2 is inserted obliquely into the insertion hole 4 as shown in FIG. 24, the distal end of the pipe 2 abuts only the protector 52 covering the pressing portion 18 of the slider 13A, but does not abut the pressing portion 18. Accordingly, since the slider 13A is prevented from being erroneously thrust in, the engaging claws 55 remain engaging the engagement grooves 1A. Consequently, the checking function of the fitting checker 50 can be maintained and accordingly, whether the pipe 2 has completely been inserted can be reliably detected.

According to the fourth embodiment, in addition to preventing dust from invasion into the main body 1, the checking function of the fitting checker can be prevented from being damaged by the oblique insertion of the pipe 2. Consequently, incomplete insertion can be reliably detected.

Figure 25:
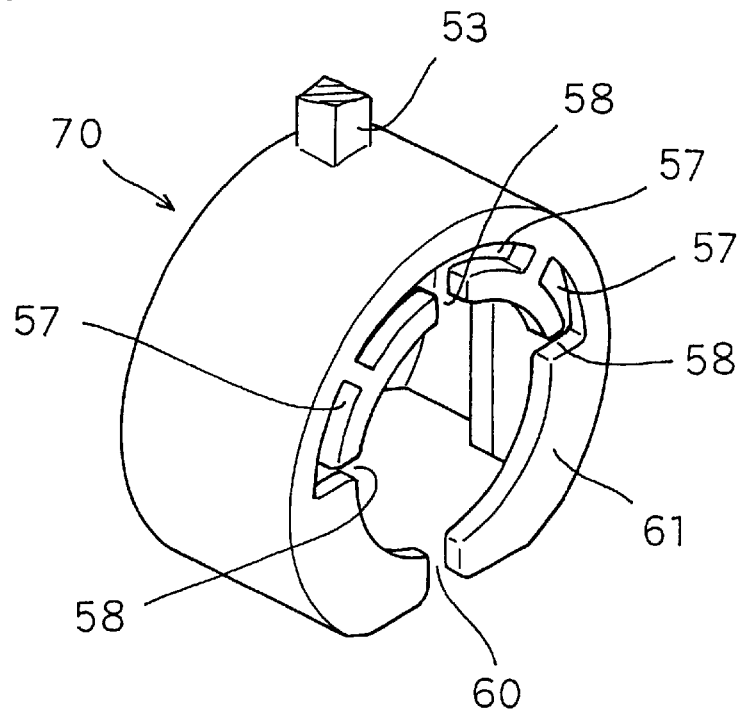
FIG. 25 is a perspective view of a fitting checker of a modified form.

The protector 52 of the fitting checker 50 has two requirements, namely, allowing the legs 51 to spread and covering the pressing portion 18 of the slider 13A. The protector 52 can be modified only if these requirements are met. For example, FIG. 25 shows a fitting checker 70 in a modified form. The protector 61 has three upper cutout portions 58, instead of two. This further facilitates spreading of the legs and reduces an insertion resistance of the pipe 2 accordingly, resulting in a reduction in inserting load. Thus, when the protector 61 is circumferentially divided into a plurality of pieces, the inserting load can be adjusted according to the number of divided pieces.

Figure 26:
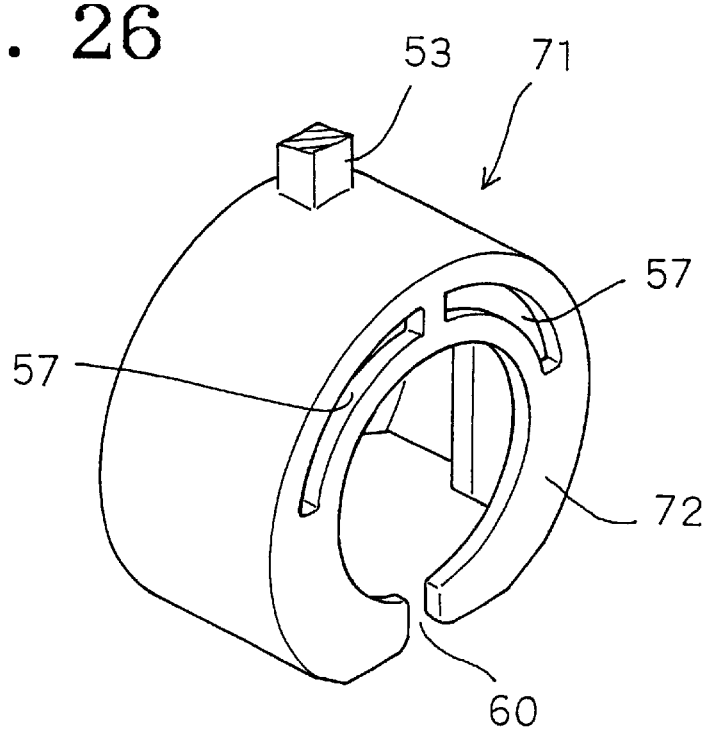
FIG. 26 is a perspective view of a fitting checker of another modified form.
Figure 27:
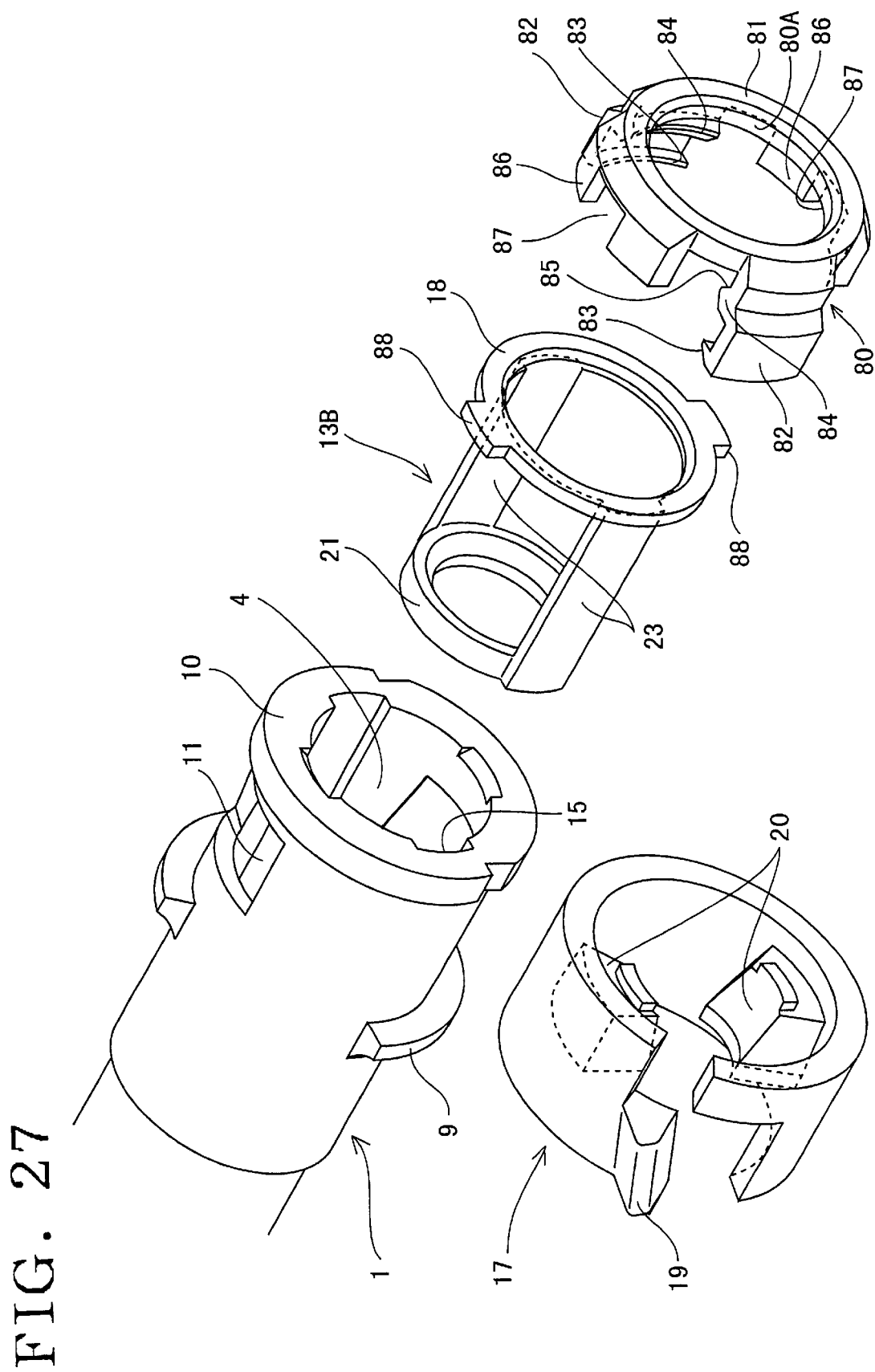
FIG. 27 is an exploded perspective view of the pipe fitting of a fifth embodiment in accordance with the present invention.
Figure 28:
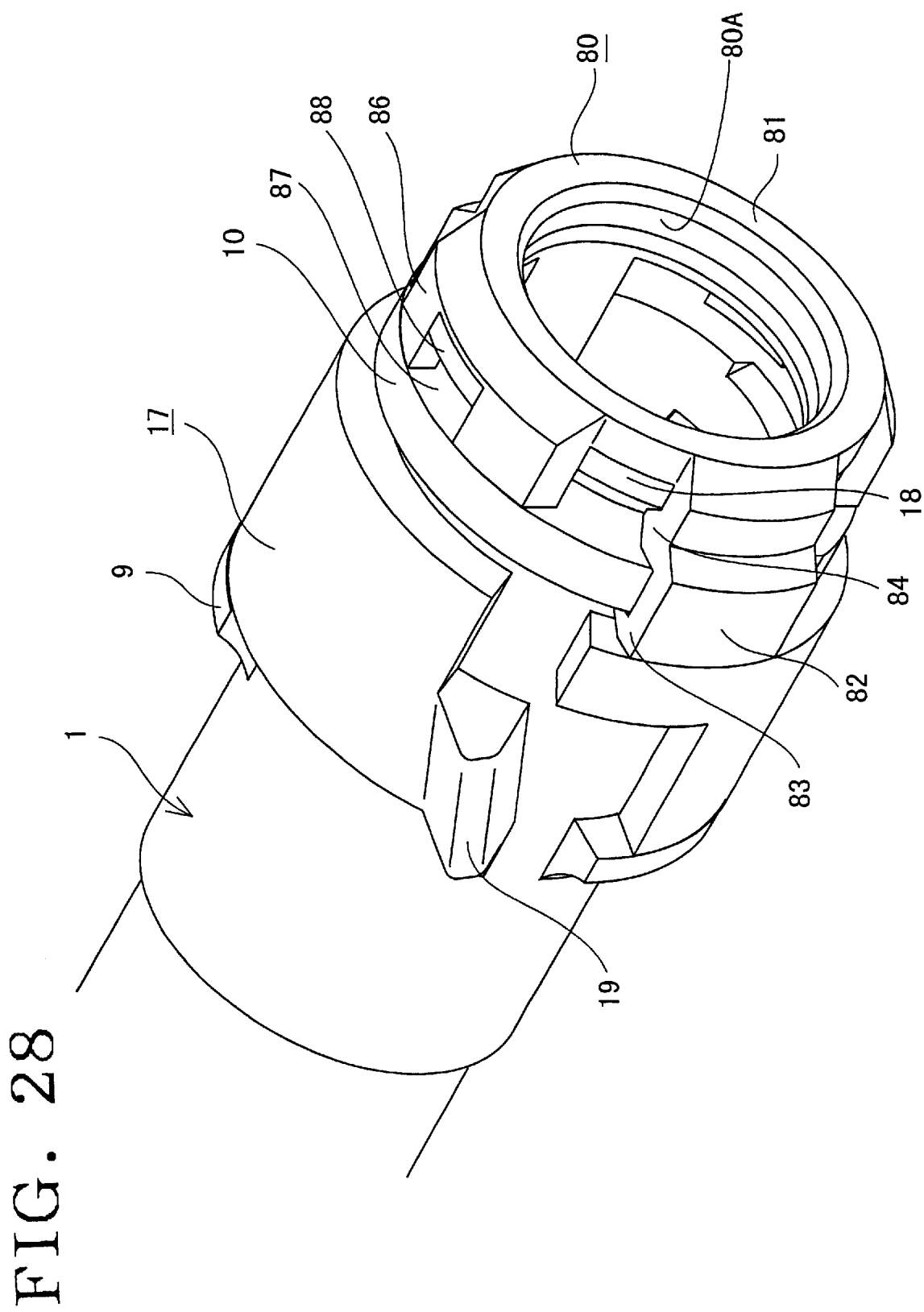
FIG. 28 is a perspective view of the pipe fitting, showing the state thereof before insertion of the pipe.
Figure 29:
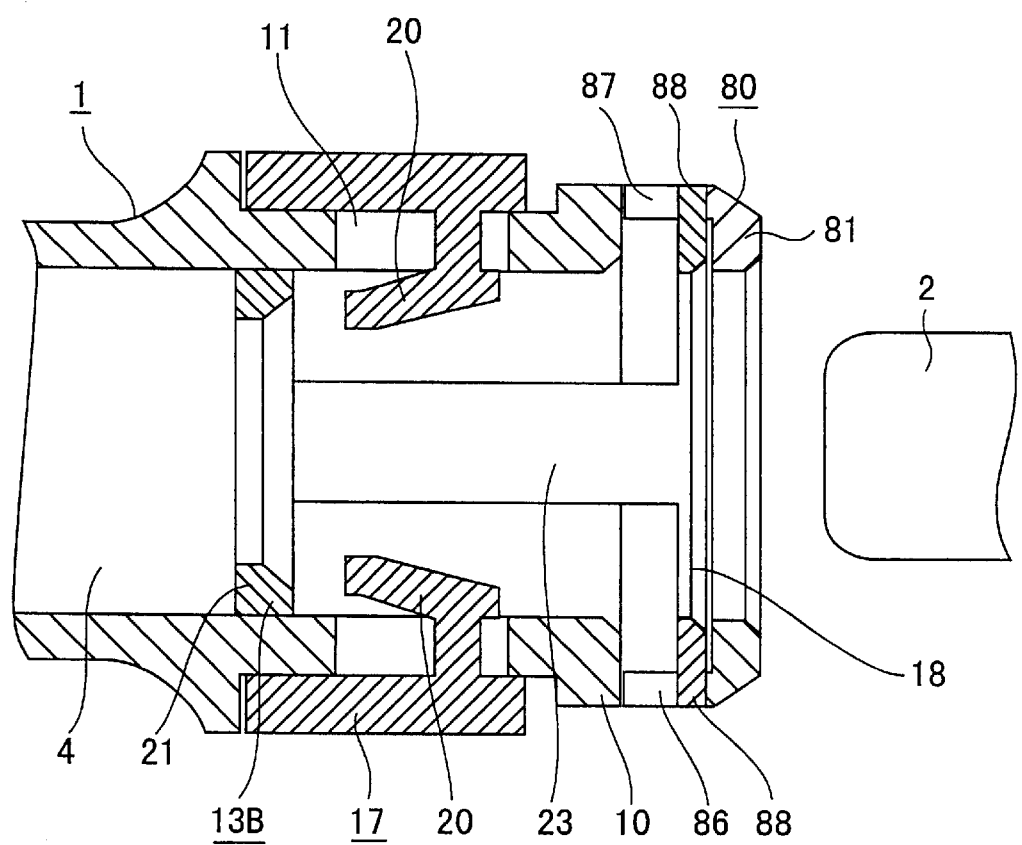
FIG. 29 is a sectional view of the pipe fitting, showing the state of the falling-off preventing protrusions before insertion of the pipe.
Figure 30:
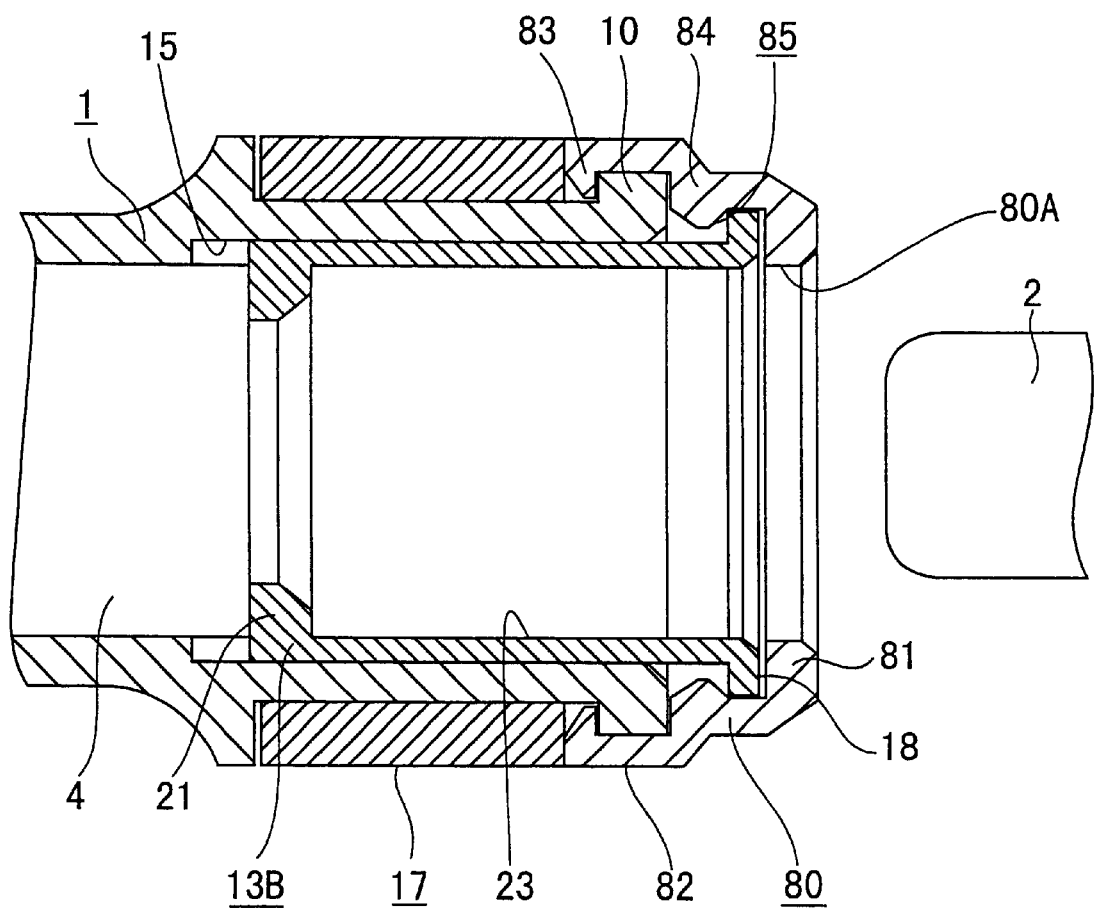
FIG. 30 is a sectional view of the pipe fitting, showing the state of the legs before insertion of the pipe.

FIG. 26 shows a fitting checker 71 in another modified form. The upper portion of the protector 72 has only two slits but no cutout portions. In this case, the inserting load is adjusted so as to become large.

FIGS. 27 to 34 illustrate a fifth embodiment. The fitting checker 80 is detachable axially with respect to the main body 1 in the fifth embodiment. The fitting checker is detachable radially in each of the first to fourth embodiments. However, a working space for drawing out the fitting checker can sometimes not be secured radially outward depending upon the working environment. The fifth embodiment is directed to a solution for this problem, that is, a construction in which the fitting checker 80 is drawn out axially with respect to the main body 1.

The fitting checker 80 includes a ring-shaped base 81 having a circular opening 80A with such a diameter that the pipe 2 is inserted therethrough. The base 81 is opposed to the rear face of the pressing portion 18 of the slider 13B in a coaxial relation therewith. A pair of legs 82 protrude from respective symmetrical locations on the outer circumferential edge of the base 81 axially toward the pipe retainer 17 with respect to the main body 1. The legs 82 have engaging claws 83 extending inward from the distal ends, respectively. The claws 83 engage and disengage from the inside of the flange 10 of the main body 1, thereby preventing the fitting checker 80 from axially falling off from the main body. Each leg 82 has a releasing protrusion 84 formed on the central inside thereof. Each releasing protrusion 84 is located between the pressing portion 18 of the slider 13B and the flange 10 of the main body 1. Each releasing protrusion 84 has a face opposed to the pressing portion 18 of the slider 13B and serving as an inclined face 85. The slider 13B moves ahead with advancement of the pipe 2, so that the pressing portion 18 slides along the inclined faces 85. As a result, each leg 82 elastically deforms in a rising direction about a portion thereof around its root. When the pipe 2 reaches the normal position, each leg 82 rises uppermost so that the engaging claws 83 are allowed to disengage from the flange 10.

Two positioning pieces 86 arcuately project from portions of the outer circumferential edge of the base 81 between the legs 82 toward the pipe retainer 17. The positioning pieces 86 are located symmetrically and have respective distal ends abutting the rear end face of the flange 10 to thereby limit the forward movement of the fitting checker 80. A notch 87 is formed in the central distal end of each positioning piece 86. A pair of positioning protrusions 88 protrude axially outward from the outer circumferential edge of the pressing portion 18 of the slider 13B so as to correspond to the respective notches 87. The positioning protrusions 88 are displaced about 90 degrees relative to the connecting portions 23. The positioning protrusions 88 fit into the respective notches 87 so that the fitting checker 80 is prevented from rotation.

Figure 31:
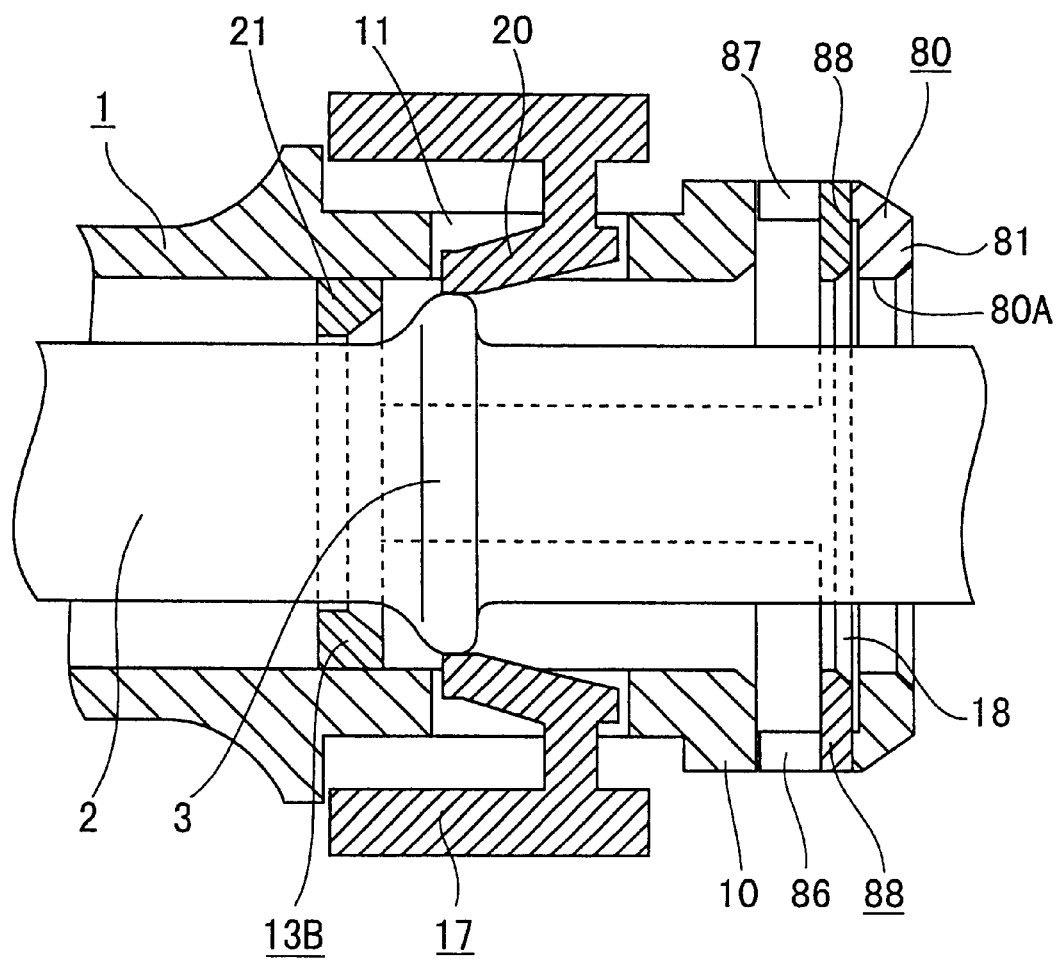
FIG. 31 is a sectional view of the pipe fitting, showing the flange of the pipe passing the falling-off preventing protrusions of the pipe retainer.
Figure 33:
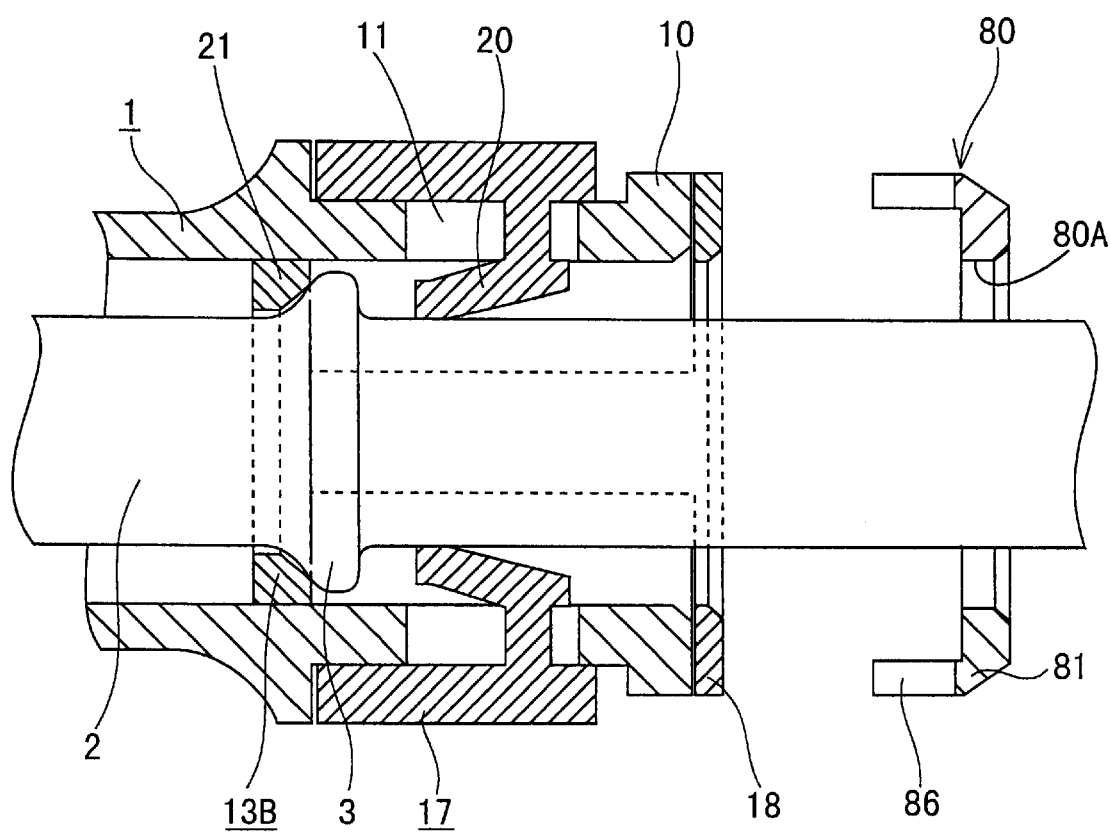
FIG. 33 is a sectional view of the pipe fitting, showing the fitting checker completely released.
Figure 34:
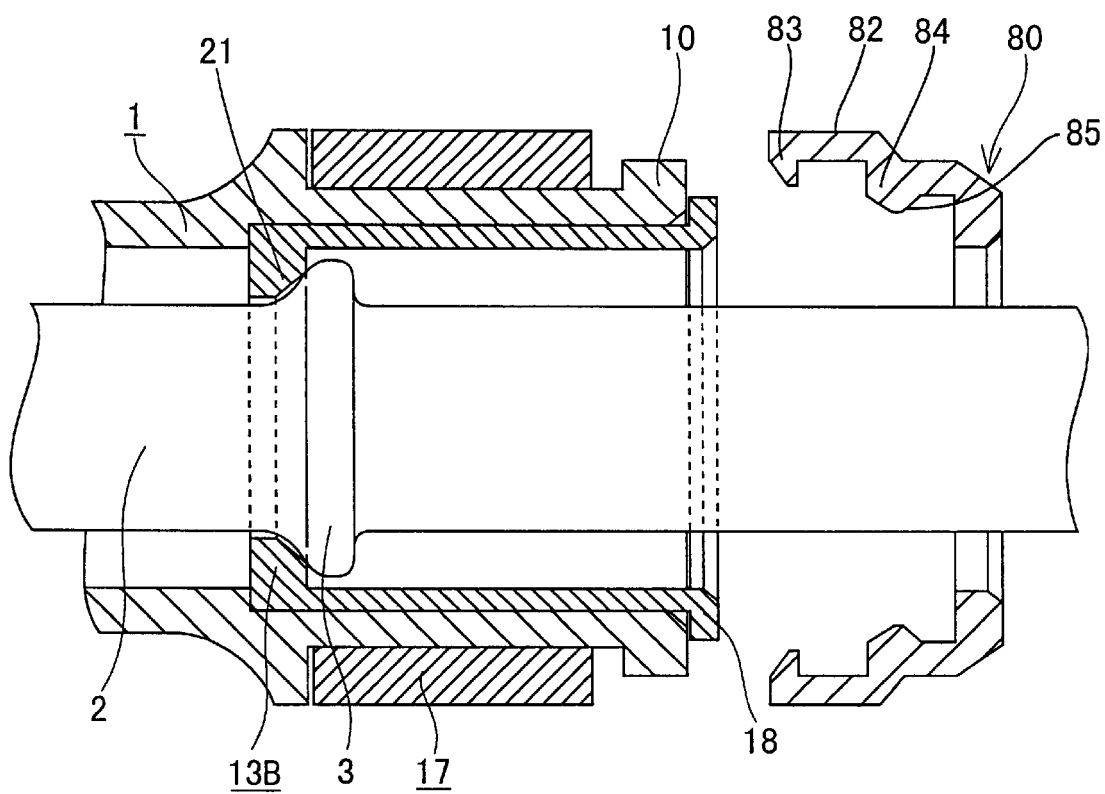
FIG. 34 is a sectional view of the pipe fitting, showing the fitting checker completely released as viewed from a different angle from that of FIG. 33.

The operation of the pipe fitting of the fifth embodiment will be described. The pipe 2 is moved forward in the insertion hole 4 when fitted into it from behind the fitting checker 80 along the axis. The flange 3 of the pipe 2 slides on the falling-off preventing protrusions 20 of the pipe retainer 17 until the pipe 2 reaches the normal insertion position. Accordingly, the protrusions 20 move outward when subjected to a spreading deformation of the pipe retainer 17, as shown in FIG. 31. When the pipe 2 assumes the normal insertion position, the flange 3 passes the protrusions 20. The pipe retainer 17 then elastically returns to its former state such that the protrusions 20 are positioned behind the flange 3, whereby the pipe 2 is prevented from falling off as shown in FIG. 33.

Figure 32:
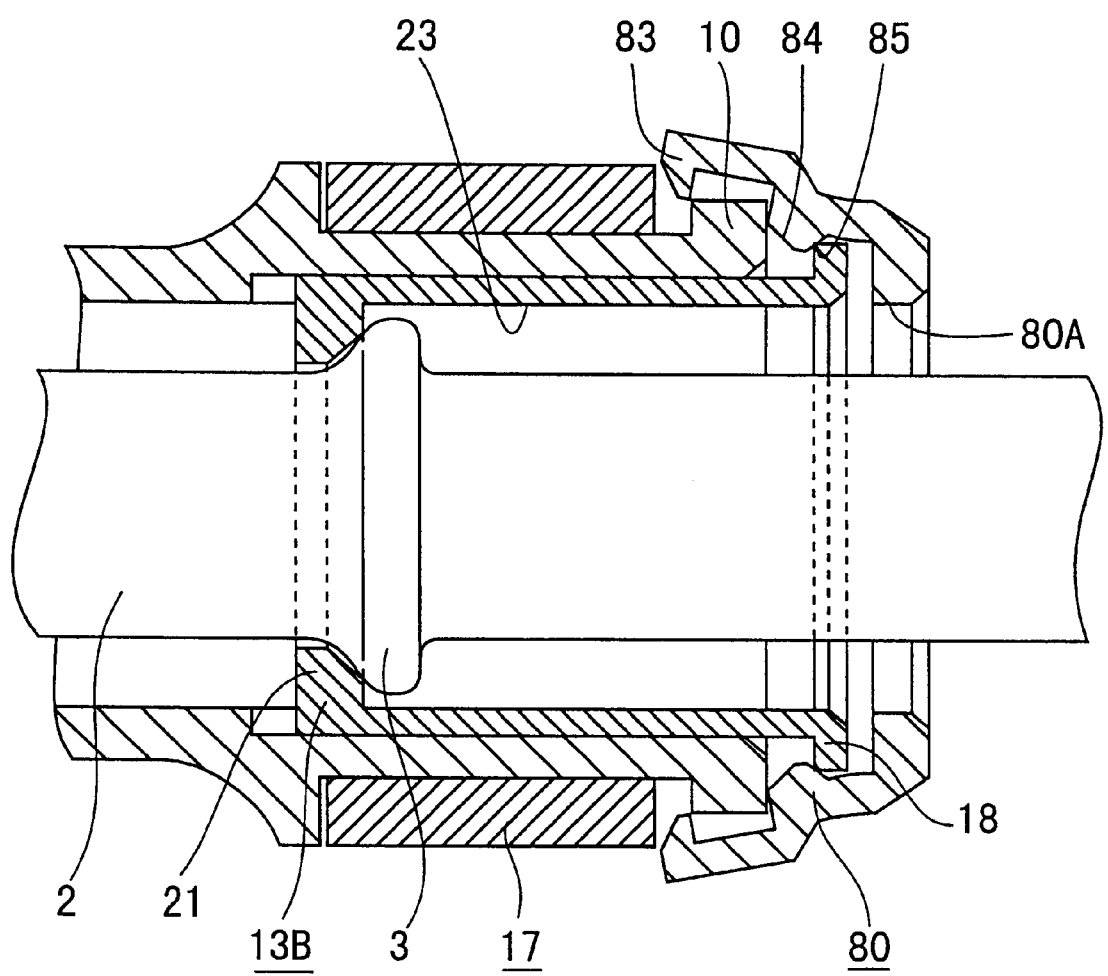
FIG. 32 is a sectional view of the pipe fitting, showing the fitting checker being released from the engagement.

The flange 3 presses the pressed portion 21 to move the slider 13B forward immediately after having passed the protrusions 20. In the interim, the pressing portion 18 of the slider 13B slides on the inclined faces 85 of the respective releasing protrusions 84 of the fitting checker 80. As a result, the fitting checker 80 is pushed forward such that the distal ends of the legs 82 are pushed against the confronting side edge of the pipe retainer 17, whereupon the fitting checker 80 is raised about its portions around the roots of the legs 82 while slightly flexing outward, as shown in FIG. 32. Thus, when the pipe 2 assumes the normal insertion position, the claws 83 of the legs 82 disengage from the flange 10 of the main body 1. Consequently, a spring force of the legs 82 drives the fitting checker 80 outward such that the fitting checker disengages from the main body 1.

In the fifth embodiment, too, whether the pipe 2 has normally been inserted can be understood by determining whether the fitting checker 80 disengages from the main body 1 of the pipe fitting. Particularly in the fifth embodiment, the fitting checker 80 is moved for disengagement axially with respect to the main body 1. Consequently, the construction of the fifth embodiment is advantageous when a sufficient working space for drawing out the fitting checker cannot be secured radially outwardly. Since the remaining construction of the pipe fitting of the fifth embodiment is the same as that in each of the foregoing embodiments, the same effect can be achieved from the fifth embodiment as that from each of the foregoing embodiments.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A pipe fitting into which a pipe having a falling-off preventing flange bulging along an outer circumference near one end thereof is inserted, thereby connecting the pipe, the pipe fitting comprising:

a main body having an insertion hole into which the pipe is inserted and a circumferential wall formed with a window communicating with the insertion hole;

a pipe retainer attached to the main body so as to be elastically deformable, the pipe retainer including a falling-off preventing protrusion protruding through the window of the main body into the insertion hole, the falling-off preventing protrusion being pushed by the falling-off preventing flange of the pipe radially outward with respect to the main body during insertion of the pipe into the insertion hole so that the falling-off preventing flange is allowed to pass the falling-off preventing protrusion, the falling-off preventing protrusion being returned by elasticity of the pipe retainer to a position where the protrusion protrudes into the insertion hole, after the falling-off preventing flange has passed the falling-off preventing protrusion, thereby limiting movement of the falling-off preventing flange in a falling-off direction;

a slider provided in the insertion hole of the main body so as to be moved axially with respect to the main body, the slider including a pressed portion which the falling-off preventing flange abuts so that the slider is axially thrust in when the pipe is inserted into the insertion hole of the main body;

a fitting checker including a pair of spreading legs having respective claws, the fitting checker being detachably attached to the main body so that the legs thereof hold the main body, the claws engaging the body and/or the slider so that the fitting checker is prevented from being detached from the body when the legs are closed, and the legs being spread to release the claws from engagement with the body and/or the slider so that the fitting checker is allowed to be detached from the body;

a plurality of releasing protrusions formed to protrude from respective inside portions of the legs of the fitting checker respectively, the releasing protrusions being pressed so that the legs are elastically deformed in respective spreading directions; and a pressing portion provided on the slider so as to press the releasing protrusions of the fitting checker to thereby spread the legs of the fitting checker when the pipe is inserted into the insertion hole to assume a normal fitting position so that the slider is displaced to a normal thrust position.

2. The pipe fitting according to claim 1, wherein the main body has an end formed with a flange having a plurality of grooves, the slider has a plurality of grooves formed in the pressing portion thereof, and the claws of the fitting checker are formed on distal ends of the legs thereof, the claws engaging the respective grooves of both of the main body and the slider.

3. The pipe fitting according to claim 1, wherein the slider has a plurality of grooves formed in the pressing portion thereof, and the claws of the fitting checker are formed on, distal ends of the legs thereof, the claws engaging the grooves of the slider respectively.

4. The pipe fitting according to claim 1, wherein the fitting checker is formed into the shape of a ring having an opening through which the pipe is allowed to be inserted, and the legs of the fitting checker extend axially with respect to the main body.

5. The pipe fitting according to claim 3, wherein the fitting checker has a protector portion formed along a peripheral edge of one end thereof so as to project inward with respect to the fitting checker and so as to cover the pressing portion of the slider when the fitting checker is attached to the body.

6. The pipe fitting according to claim 5, wherein the protector portion is divided into a plurality of portions by cutout portions formed radially with respect to the body.

* * * * *